US012675954B2

(12) United States Patent
Ying

(10) Patent No.: US 12,675,954 B2
(45) Date of Patent: Jul. 7, 2026

(54) COMPUTER-ALTERED REALITY DATA RENDERING COORDINATION

(71) Applicant: T-Mobile USA, Inc., Bellevue, WA (US)

(72) Inventor: Wen-Ping Ying, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 439 days.

(21) Appl. No.: 18/339,759

(22) Filed: Jun. 22, 2023

(65) Prior Publication Data

US 2024/0428522 A1      Dec. 26, 2024

(51) Int. Cl.
  *G06T 19/00*      (2011.01)
  *G06T 15/40*      (2011.01)
  *H04L 67/131*      (2022.01)
(52) U.S. Cl.
  CPC .............. *G06T 19/00* (2013.01); *G06T 15/40* (2013.01); *H04L 67/131* (2022.05)
(58) Field of Classification Search
  None
  See application file for complete search history.

(56) References Cited

U.S. PATENT DOCUMENTS 11,145,096 B2   10/2021  McHugh et al.
2012/0066303 A1*  3/2012  Purdy ................. G06F 16/1805
                                           709/204

2019/0311471 A1   10/2019  Kurabayashi
2021/0144517 A1    5/2021  Guim Bernat et al.
2023/0298130 A1*   9/2023  Tamaki ................... H04L 67/12
                                           382/305
2024/0064360 A1*   2/2024  Zhao .................. H04N 21/2662
2024/0346793 A1*  10/2024  Gausebeck ............. G06T 7/579
2024/0428521 A1   12/2024  Ying

OTHER PUBLICATIONS

Office Action for U.S. Appl. No. 18/339,739, Dated May 7, 2025, Ying, "Location-Based Computer-Altered Reality Data Rendering Management Using Rendering Oriented Characteristic Data," 23 pages.
Office Action for U.S. Appl. No. 18/339,739, dated Oct. 22, 29 Pages.

* cited by examiner

*Primary Examiner* — Saptarshi Mazumder
(74) *Attorney, Agent, or Firm* — Lee & Hayes, P.C.

(57) ABSTRACT

Techniques, devices, and systems for computer-altered reality data rendering coordination are discussed herein. Coordination of disjointed and/or distributed rendering of computer-altered reality data (e.g., extended reality (XR) data) performed by networks and systems can be performed. The coordination can be performed based on various types of information. Information utilized to perform the coordination of computer-altered reality data rendering can include coordination and/or rendering information (e.g., global coordination information, global rendering information, other global information of one or more other types, or any combination thereof). The computer-altered reality data can be rendered utilizing coordinated nodes, which can provide rendered computer-altered reality data for the user devices.

20 Claims, 4 Drawing Sheets

300

300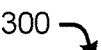

EXCHANGE, WITH A USER DEVICE, AT LEAST ONE COMMUNICATION ASSOCIATED WITH COMPUTER-ALTERED REALITY DATA
302

TRANSMIT, TO AT LEAST ONE COORDINATED NODE, AT LEAST ONE SET OF THE COMPUTER-ALTERED REALITY DATA, THE AT LEAST ONE COORDINATED NODE UTILIZING AT LEAST ONE PORTION OF COMPUTER-ALTERED REALITY DATA RENDERING INFORMATION TO RENDER, AS AT LEAST ONE SET OF RENDERED COMPUTER-ALTERED REALITY DATA, THE AT LEAST ONE DATA SET OF COMPUTER-ALTERED REALITY DATA
304

RECEIVE, FROM THE AT LEAST ONE COORDINATED NODE, AT LEAST ONE DATA SET OF RENDERED COMPUTER-ALTERED REALITY DATA
306

ROUTE THE AT LEAST ONE DATA SET OF THE RENDERED COMPUTER-ALTERED REALITY DATA TO THE USER DEVICE
308

FIG. 3

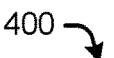
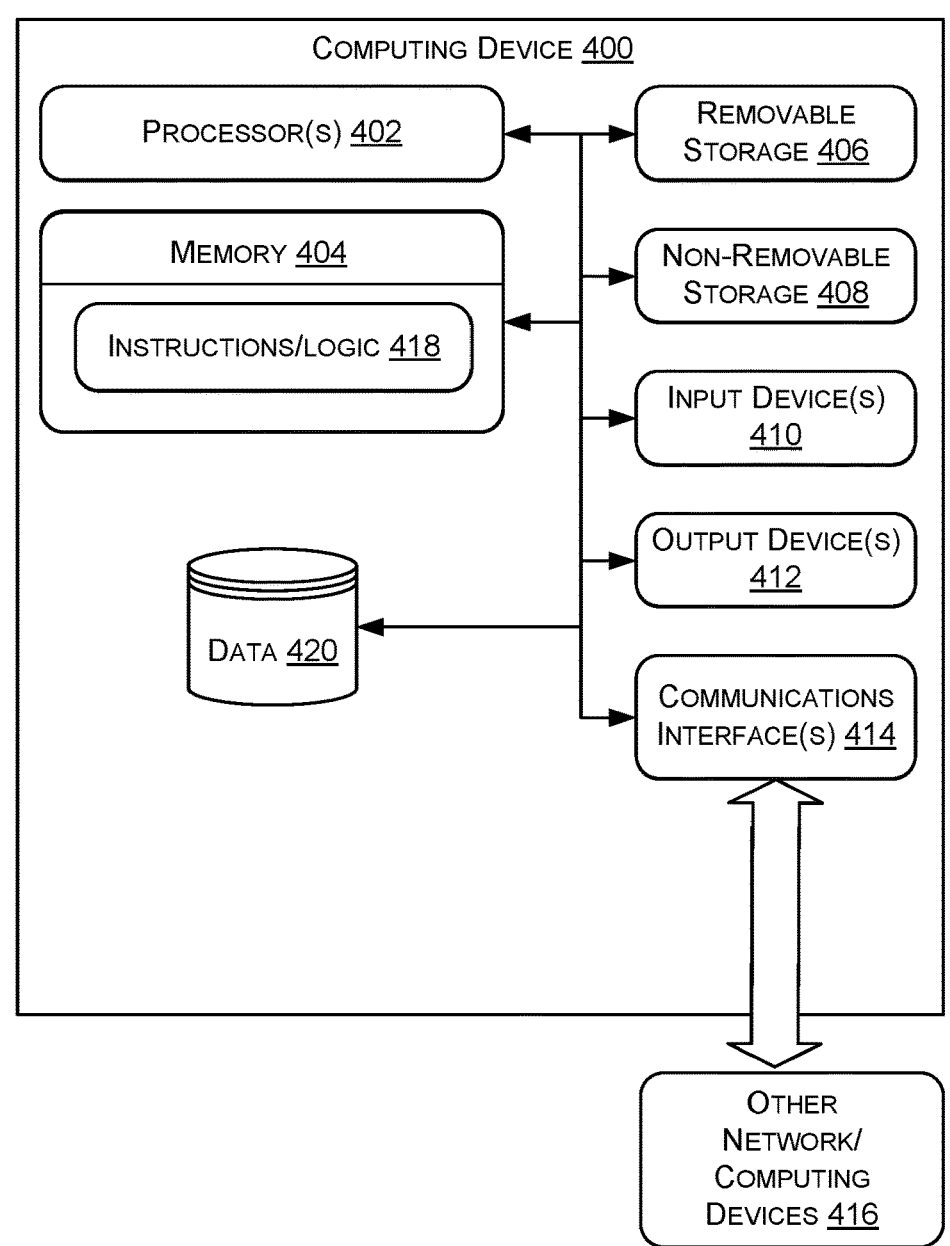
COMPUTING DEVICE 400
PROCESSOR(S) 402
MEMORY 404
INSTRUCTIONS/LOGIC 418
DATA 420
REMOVABLE STORAGE 406
NON-REMOVABLE STORAGE 408
INPUT DEVICE(S) 410
OUTPUT DEVICE(S) 412
COMMUNICATIONS INTERFACE(S) 414
OTHER NETWORK/ COMPUTING DEVICES 416
FIG. 4

COMPUTER-ALTERED REALITY DATA RENDERING COORDINATION

BACKGROUND

Systems and networks are utilized to operate utilizing types of computer-altered reality technologies, including an extended reality (XR) technology. The systems and networks, which are operated utilizing the XR technology, manage XR data, which can include augmented reality (AR) data, virtual reality (VR) data, mixed reality (MR) data, or a combination thereof. The systems and networks being operated utilizing the XR technology enable mobility of the mobile devices to be increased in comparison to other systems and networks being operated utilizing other computer-altered reality technologies, such as an MR technology. The XR technology enables the mobile devices to access, via wide area access, a metaverse established by the XR data by which the mobile devices are communicatively coupled to a three-dimensional (3D) internet. The mobile devices, accessing the metaverse, enable users to interact with a real world, a digital world, a virtual world, or a combination thereof.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 depicts an example process for computer-altered reality data rendering coordination illustrated in FIGS. 1 and 2.

FIG. 4 depicts an example system architecture for a computing device.

DETAILED DESCRIPTION

Figure 1:
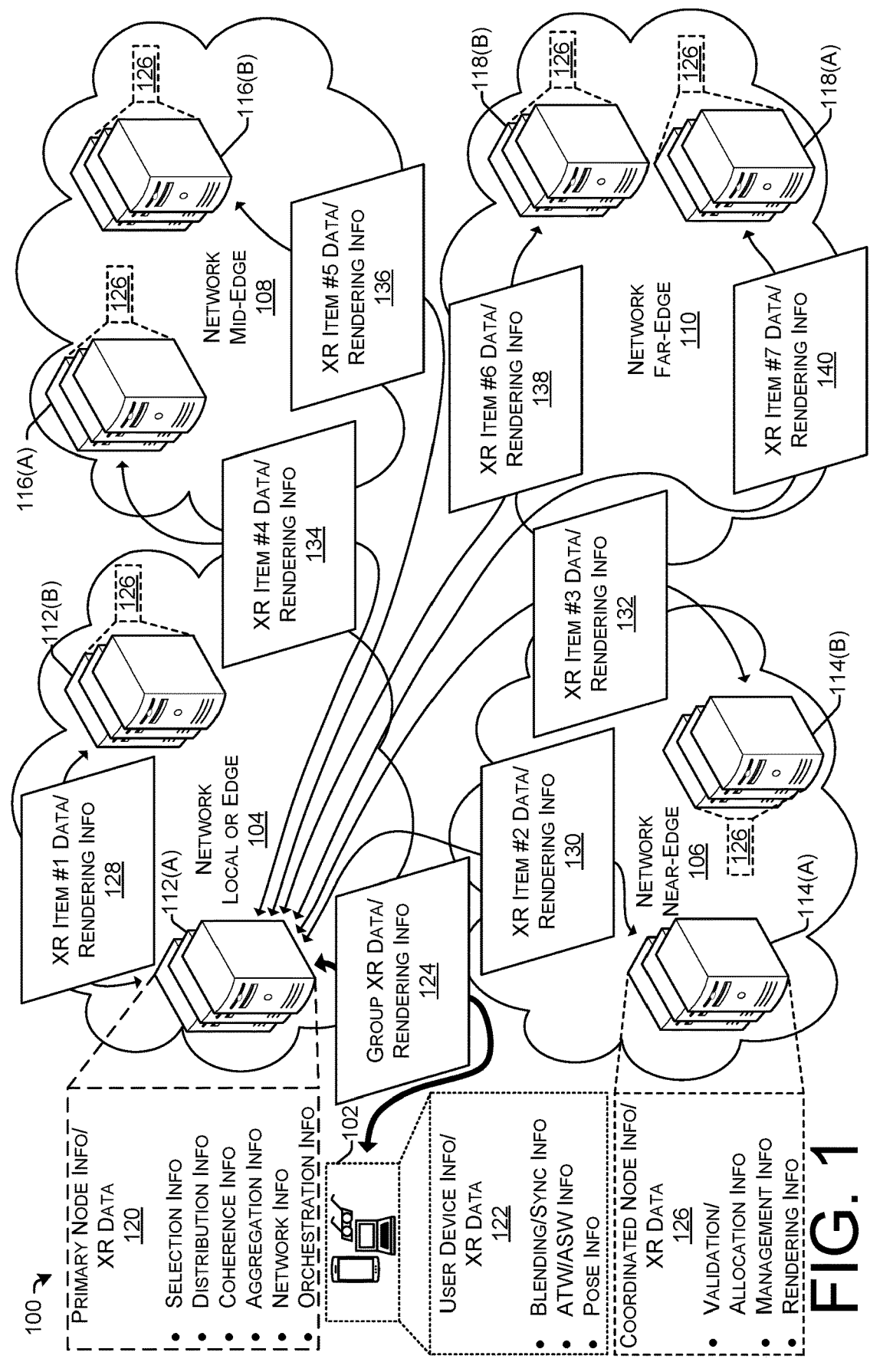
FIG. 1 depicts an example network environment for managing computer-altered reality data rendering coordination.

Techniques for location based computer-altered reality data rendering coordination are discussed herein. For example, coordination of disjointed and/or distributed rendering of computer-altered reality data (e.g., extended reality (XR) data) performed by networks and systems can be performed based on various types of information. Information utilized to perform coordination of computer-altered reality data rendering can include coordination and/or rendering information (e.g., global coordination information, global rendering information (e.g., information associated with one or more lightings, one or more poses, one or more locations, etc., associated with one or more items, respectively), other global information of one or more other types, or any combination thereof)), which can include primary node information, coordinated node information, user device information, other coordination and/or rendering oriented information of one or more other types, or any combination thereof. The coordination and/or rendering information can include world space coordinate information (e.g., one or more world space coordinates, information associated with the world space coordinate(s)) and/or universal time coordinate information (e.g., one or more universal time coordinates). Coordination of the computer-altered reality data rendering can be performed by network servers at locations associated with locations of user devices. The computer-altered reality data can be rendered utilizing coordinated nodes, which can provide rendered computer-altered reality data. The rendered computer-altered reality data can be provided to, and output by, the user devices.

The coordination of the disjointed and/or distributed rendering can be performed to provide efficient and effective rendering of computer-altered reality data utilized by the user devices. The coordination can be performed by primary nodes associated with servers at various network locations, such as edges of networks associated with locations of the user devices. The primary nodes can be utilized to manage various types of information utilized for the coordination of the rendering of the computer-altered reality data. Master node information of various types being managed by the primary nodes can include selection information, distribution information, coherence information, aggregation information, network information, service orchestration information (or "orchestration information"), one or more other types of other primary node information, or any combination thereof.

The coordination can be performed based on the coordinated node information, which can be utilized by other nodes than the primary nodes. The other nodes can include coordinated nodes associated with servers. The servers with which the coordinated nodes are associated can include servers at various network locations, such as near-edges, mid-edges, and far-edges of networks. The coordinated node information can include coordinated node validation information, coordinated node allocation information, dynamic resource management information, item rendering information, one or more of other types of other coordinated information, or any combination thereof.

The coordination can be performed based on the user device information, which can be associated with the user devices. The user device information can include blending information, synchronization information, asynchronous time warp (ATW) information, asynchronous spatial warp (ASW) information, occlusion handling information, pose loop information, one or more of other types of user device information, or any combination thereof.

The coordination of the computer-altered reality data rendering, and the rendering of the computer-altered reality data, can be performed utilizing software of various types. The software can include plugins utilized by various servers of the networks. The plugins, which can be utilized by the primary nodes of the servers, can include, rendering item plugins (e.g., rendering object plugins), rendering service plugins, rendering management plugins, one or more other types of plugins of other plugins (e.g., any of one or more of various types of plugins utilized to customize software (e.g., rendering software), or any combination thereof. Rendering item plug information associated with the rendering item plugins can include object model information (e.g., information associated with a "model," such as a computer-altered reality data set, being sent to the coordinated noted for rendering), object texture information (e.g., information associated with one or more "fragment shaders" being texture mapped to a service), one or more other types of rendering item plugin information, or any combination thereof. The rendering service plugins can include object classification information, rendering resource request information, universal coordinate information, global illumination (GI) reference information, one or more other types of rendering service plugin information, or any combination thereof. The rendering management plugins can include compute resource selection information, distribution procedure information, compute resource reselection procedure information, one or more other types of rendering management plugin information, or any combination thereof.

The rendered computer-altered reality data can be blended and recomposited and utilized, as blended computer-altered reality data, by the primary nodes and/or by the user devices. For example, game logic can be performed, and/or the rendered computer-altered reality data can be blended and/or composited, at the primary nodes and/or the user devices. By performing the game logic at the primary nodes (e.g., the servers, such as servers at the edge network) and by performing blending at the user devices (e.g., a client) (e.g., blending based on the "unblended" data being sent to the user devices, for example, via lossless compression), airlink (over the air ("OTA")) resources may be relatively conserved (e.g., OTA resources may be relatively conserved, because some "lower frequency resources" (e.g., lower priority data) may be communicated less frequently than "higher frequency resources" (e.g., higher priority data)). By performing game logic and blending at the user devices (e.g., the client), airlink resources may be conserved. By performing game logic and blending at the servers (e.g., the servers at the edge) and streaming the blended data (e.g., blended computer-altered reality data) to the user devices (e.g., the client), compute requirements on the user devices (e.g., the client) may be conserved (e.g., reduced), notwithstanding airlink resources being utilized for the streaming of the blended data.

Blending and/or recompositing of rendered computer-altered reality data can be performed by the primary nodes, the user devices, one or more other types of servers and/or devices, or a combination thereof. Performing of the blending and the recompositing by servers (e.g., the servers with which the primary nodes are associated) can be utilized to conserve compute resources associated with the user devices (e.g., compute resources associated with the user devices may be conserved by performing of the blending and the recompositing by servers even though, in some cases, this may require consumption of relatively more cellular network resources in comparison to cases in which blending and recompositing are performed by the user devices). In various examples, performing of the blending and the recompositing by the user devices with which the primary nodes are associated can be utilized to conserve cellular network resources (e.g., cellular network resources may be conserved by performing of the blending and the recompositing by the user devices, even though, in some cases, this may require consumption of relatively more compute resources associated with the user devices in comparison to cases in which blending and recompositing are performed by the servers (e.g., by the servers with which the primary nodes are associated)).

Utilizing the coordination of the computer-altered reality data rendering, including the disjointed and/or distributed rendering, has many technical benefits. The coordination and/or rendering information (e.g., the global coordination information, the global rendering information, the other global information of the one or more other types, or any combination thereof) (e.g., information including coordination information associated with one or more coordination operations and/or rendering information associated with one or more rendering operations) can enable servers with which primary nodes are associated to be utilized to identify and utilize various types of other servers of other server grades and/or at other locations to perform the rendering of the computer-altered reality data. The coordination can be utilized to ensure that the rendered computer-altered reality data is completely and correctly blended, recomposited, and provided to the user devices.

The computer-altered reality data being completely and correctly rendered, blended, and recomposited to be utilized the user devices can conserve compute resources of the network servers and the user devices. Compute resources of the servers can be conserved by reducing numbers of rendering frames required for computer-altered reality data rendering, in comparison to existing systems, in which priorities otherwise stay fixed. In contrast to servers utilizing conventional data computer-altered reality data rendering techniques, the servers utilizing the coordination of the computer-altered reality data rendering according to the techniques discussed herein can render, blend, and recomposite the computer-altered reality data with higher levels of effectiveness and reliability. Various compute resources being conserved due to the higher levels of effectiveness and reliability of the rendering, blending, and recompositing of the computer-altered reality data can be allocated for other tasks.

Processing of the user devices according to the techniques discussed herein may be enabled to satisfy metrics that may otherwise remain unsatisfied in existing systems. In contrast to user devices having insufficient capabilities to effectively render computer-altered reality data in existing systems in such a way as to satisfy metrics, the rendering, blending, and/or recompositing of the computer-altered reality data utilizing the techniques discussed herein can be performed by user devices in such a way as to satisfy one or more rendering, blending, and/or recompositing metrics. The metrics can be satisfied due to the rendering, blending, and recompositing of the computer-altered reality data being performed efficiently and effectively to improve the user experience according to the techniques discussed herein.

Servers located within close proximities of the user devices conserve compute resources based on rendering of various types of computer-altered reality data (e.g., higher priority computer-altered reality data) being performed by relatively nearer servers (e.g., servers that are associated with the primary node and/or the coordinated nodes and that nearer than other servers associated with other coordinated nodes). The computer-altered reality data being rendered by closer servers can include data of relatively higher priorities, such as computer-altered reality data being associated with computer generated items experiencing relatively greater user interactions and/or computer-altered reality data being associated with computer generated items experiencing relatively greater motion (e.g., due to higher priority data having morefrequent rendering needs). The compute and memory resources of the servers (e.g., the servers for the coordinated node(s) being relatively farther from the primary node and/or the user devices) may be conserved based on higher priority data being processed by the relatively nearer servers (e.g., the server(s) for the primary node and/or other server(s) associated with the more distant coordinated node(s)).

Compute and memory resources of servers, which may be more remote from the primary node and/or the user devices, may be utilized to process lower priority data. By utilizing the servers associated with the coordinated nodes being relatively more distant to process lower priority data, compute and memory resources of the nearer servers may be conserved. The compute and memory resources of the servers (e.g., the server(s) for the primary node) and/or other servers (e.g., the servers for the coordinated node(s) being nearer to the primary node and/or the user devices), may be conserved based on lower priority data being processed by the servers associated with the more distant coordinated node(s).

While rendering of the computer-altered reality data according to conventional technologies may result in slower processing of the computer-altered reality data and consequential delays, the compute and memory resources of the servers being relatively close to the user devices according to the techniques discussed herein may be utilized more efficiently and effectively. By utilized the compute and memory resources of the servers more efficiently and effectively, the conserved compute and memory resources of the relatively nearer servers may be made available to be allocated for other tasks.

Compute and memory resources of the user devices (or "mobile devices") according to the techniques discussed herein may be conserved more than in conventional systems. The mobile devices operating according to the techniques discussed herein may process the computer-altered reality data being rendered by various servers at different locations based on priorities of the data. By utilizing the computer-altered reality data that is rendered by the servers at the different locations based on the priorities of the computer-altered reality data, the mobile devices may receive rendered computer-altered reality data more efficiently and accurately (e.g., with higher fidelity and/or with higher rendering accuracy, due to more powerful compute resources (e.g., compute resources of the server(s)) being utilized for performing the rendering), and more frequently, than in existing systems and networks (e.g., since needs for local compute for rendering are no longer required).

By receiving the rendered computer-altered reality data at the different rates, relatively higher priority rendered computer-altered reality data may be obtained by the mobile devices efficiently, notwithstanding needs to also render lower priority data. In comparison to existing networks and systems for which data rendering may need to be performed by the mobile devices, rendered computer-altered reality data according to the techniques discussed herein may be obtained by the mobile devices at correspondingly appropriate times, with relatively smaller delays.

Due to the rendered computer-altered reality data being obtained by the mobile devices according to the techniques discussed herein efficiently, the mobile devices may have relatively smaller form factors, may be relatively lighter, may experience relatively less power consumption, may include relatively smaller amounts of processing, memory, and power resources, and so on, or any combination thereof. The mobile devices according to the techniques discussed herein, which may, for example, be relatively smaller and may include relatively smaller amounts of processing and memory resources, may still effectively display high quality rendered computer-altered reality data based on the rendered computer-altered reality data being received efficiently, with relatively smaller delays.

By utilizing the servers with which the primary nodes are connected to performing the blending and the recompositing of the rendered computer-altered reality data, compute resources of the user devices can be conserved. Although OTA bandwidth may be utilized based on the servers transmitting blended and recomposited rendered computer-altered reality data, the user devices expend relatively fewer compute resources. The user devices expending relatively fewer compute resources enables compute resources of the user devices to be allocated for other tasks.

Furthermore, management of network resources of the networks utilized to exchange communications associated with rendering of the computer-altered reality data may be improved according to the techniques discussed herein. Alternative to utilizing the servers for performing blending and recompositing functions, the blending and the recompositing of the rendered computer-altered reality data can be performed by the user devices. By performing the blending and the recompositing of the rendered computer-altered reality data by the user devices, demands put on network resources may be relatively lower. Although the user devices may expend computes resources to blend and recomposite the rendered computer-altered reality data, the OTA bandwidth may be conserved by avoiding transmissions of blended and recomposited rendered computer-altered reality data and transmitting only relevant computer-altered reality frames to the user devices.

Improvements to network resources according to the techniques discussed herein significantly contribute to optimization of the user experience. Because fifth generation (5G) networks have large amounts of capacity and large amounts of bandwidth, propagation properties are often stronger for transceivers that are spaced relatively close together. By utilizing servers that are relatively close to the mobile devices to render larger portions of data that require faster rendering processing, total amounts of data being transmitted at longer distances can be decreased, and delays for rendering data that requires faster rendering processing can be decreased.

Performing rendering coordination according to the techniques as discussed herein may improve the user experience. Utilizing one or more servers that are relatively nearer to the user devices to render relatively higher priority data, such as computer-altered reality data being associated with computer-altered reality items experiencing relatively greater numbers of interactions and/or relatively greater and/or more frequent occurrences of motion, may decrease delays for rendering, and/or for transmitting, the higher priority computer-altered reality data. In comparison to existing systems that do not utilize rendering coordination, the user experience, based on the delays being reduced for rendering, and/or for transmitting, the higher priority computer-altered reality data according to the techniques discussed herein, is improved.

The rendering coordination being performed according to the techniques discussed herein may conserve the compute resources and network resources by rendering, at relatively closer locations to user devices, computer-altered reality data computer-altered reality data associated with relatively more frequent interactions/motions. For example, with some cases in which the coordination is utilized to render, at relatively closer locations to user devices, only computer-altered reality data associated with relatively more frequent interactions/motions, the coordination may be utilized to refrain from rendering lower priority items too frequently. The compute and network resources may be conserved based on the lower priority items not being rendered more frequently than necessary Moreover, tiered rendering (e.g., location based rendering) techniques according to the techniques discussed herein reduce overall amounts of network traffic. The computer-altered reality data, which can include various types of data, such as foreground data requiring faster rendering processing, and background data not requiring as fast of rendering processing, can be rendered at locations capable of rendering according to needs of various types of data. Background objects can be rendered by servers farther from mobile devices, and foreground objects can be rendered by servers closer to mobile devices.

By utilizing the various types of data at locations capable of rendering the computer-altered reality data according to needs of the various types of data, resources such as edge servers can be conserved. The edge servers, which typically can become overloaded at peak times or times at which many mobile devices gathered together in small locations (e.g., mobile devices at particular events, in ball-parks, event venues, etc.), can be utilized to render high priority data (e.g., at 60-75 frames/second, etc.), and can send off other data to be rendered by other servers. Because the other data being sent off by the edge servers is being rendered more slowly (e.g., 15 frames/second, 10 frames/second, etc.), overall amounts of air traffic can be decreased.

By utilizing edge servers, for example, to manage location based rendering, overall utilization of compute, memory, and network resources can be improved according to the techniques discussed herein, in comparison to existing systems, that do not utilize location based rendering. The edge servers, which can be utilized to blend all of the rendered data received from other servers according to the techniques discussed herein, can identify how the rendered data is to be collected and/or assembled for transmission to, utilization by, the mobile devices.

The edge servers identifying how the rendered data is to be collected and/or assembled, which can utilize beacons (or "heartbeats") being sent to the servers performing the rendering, can enable the servers to render the data. The edge servers, which can receive the rendered data from the servers and blend together the rendered data, can reduce consumption of resources and reduce delays that might otherwise occur according to conventional technology. Existing systems, transmitting larger data to farther away servers for rendering, without having capabilities to utilize edge servers to distribute data to be rendered, and to blend the rendered data, experience larger delays and network congestion, in comparison utilizing the location based rendering according to the techniques discussed herein.

The systems, devices, and techniques described herein can be implemented in a number of ways, for example, in the context of protocols associated with one or more of (third generation) 3G, fourth generation (4G), 4G long term evolution (LTE), and/or 5G protocol. In some examples, the network implementations can support standalone architectures, non-standalone architectures, dual connectivity, carrier aggregation, etc. References are made to the accompanying drawings that form a part hereof, and in which are shown by way of illustration specific configurations or examples, in which like numerals represent like elements throughout the several figures. Example implementations are provided below with reference to the following figures.

FIG. 1 depicts an example network environment 100 for managing computer-altered reality data rendering coordination. The environment 100 can include one or more user devices 102. The user device(s) 102 can include one or more mobile devices (e.g., one or more mobile phones, one or more smart phones, one or more other cellular phones, one or more of any other types of mobile devices, or any combination thereof), one or more personal digital assistants (PDAs), one or more personal computers (PCs) (e.g., one or more laptops, one or more desktops, one or more workstations, one or more media players, one or more tablets, one or more gaming devices, one or more any other types of PCs, or any combination thereof), one or more glasses (e.g., one or more computer-altered reality glasses, one or more extended reality (XR) glasses, one or more augmented reality (AR) glasses, one or more virtual reality (VR) glasses, one or more mixed reality (MR) glasses, or one or more of any other types of electronic glasses), one or more smart watches, one or more hotspots, one or more of any other types of computing or communication devices, or a combination thereof.

The network environment 100 can include one or more networks to which the user device(s) 102 are communicatively connected. The network(s), at one or more locations (or "network location(s)"), can be provided utilizing one or more servers (or "network server(s)"). The server(s) can be located at one or more locations (or "server location(s)"), which can include, be the same as, overlap, and/or be included in, at least one of any of the network location(s).

In some examples, the network location(s) can be associated with one or more categories (or "network category (ies)") associated with the network(s). The category(ies) can include a network local or edge category (e.g., a network edge) (or "local or edge category") (or "local or edge") (or "edge category") (or "edge") 104, a network near-edge (or "near-edge") 106, a network mid-edge (or "mid-edge") 108, a network far-edge (or "far-edge") 110, one or more other types of network categories, or any combination thereof. In some examples, a network local or edge location (e.g., one or more local or edge servers) can be associated with the local or edge 104, a network near-edge location (e.g., one or more near-edge servers) can be associated with the near-edge 106, a network mid-edge location (e.g., one or more mid-edge servers) can be associated with the mid-edge 108, a network far-edge location (e.g., one or more far-edge servers) can be associated with the far-edge 110, and/or one or more other types of network locations can be associated with the other type(s) of network categories.

The network(s) can include a service provider network, a service provider cloud network, an external network, one or more of any other types of networks, or any combination thereof. In some examples, the user device(s) 102 can be communicatively coupled to the service provider network, the service provider cloud network, the external network, the other type(s) of networks, or any combination thereof.

In various implementations, at least one of any of the network(s) can be utilized to provide one or more operations, one or more functions, one or more capabilities, etc., or any combination thereof, associated with individual ones of the network category(ies). In some examples, at least one portion of the service provider network can be utilized as the local or edge 104. In those or other examples, at least one portion of the service provider network and/or at least one portion of the external network can be utilized as the near-edge 106. In those or other examples, at least one portion of the service provider network and/or at least one portion of the external network can be utilized as the mid-edge 108. In those or other examples, at least one portion of the external network can be utilized as the far-edge 110.

Although the at least one portion of the service provider network can be utilized as the local or edge 104, the at least one portion of the service provider network and/or at least one portion of the external network can be utilized as the near-edge 106, the at least one portion of the service provider network and/or the at least one portion of the external network can be utilized as the mid-edge 108, and/or the at least one portion of the external network can be utilized as the far-edge 110, as discussed above in the current disclosure it is not limited as such. In some examples, one or more of any other networks can be utilized as individual ones of the local or edge 104, the near-edge 106, the mid-edge 108, and/or the far-edge 110.

One or more servers of various types, which can be associated with at least one of any of the network(s), can be utilized to provide individual ones of the local or edge 104, the near-edge 106, the mid-edge 108, and/or the far-edge 110. In some examples, one or more servers 112(A) and 112(B) (also collectively referred to herein as server(s) 112) can be utilized as the local or edge 104. In those or other examples, one or more servers 114(A) and 114(B) (also collectively referred to herein as server(s) 114) can be utilized to provide the near-edge 106. In those or other examples, one or more servers 116(A) and 116(B) (also collectively referred to herein as server(s) 116) can be utilized to provide the mid-edge 108. In those or other examples, one or more servers 118(A) and 118(B) (also collectively referred to herein as server(s) 118) can be utilized to provide the far-edge 110.

The server(s) 112-118 can be utilized to provide one or more various types of one or more nodes associated with rendering coordination. In some examples, the node(s) provided by the server(s) 112-118 can include one or more primary nodes, one or more coordinated nodes, one or more other types of other nodes, or any combination thereof. In those or other examples, the primary node(s) can be utilized to manage, and/or to perform, coordination of rendering (e.g., one or more rendering operations) of the computer-altered reality data. In those or other examples, the primary node(s) can be utilized to manage, and/or to perform, rendering of the computer-altered reality data. In those or other examples, the coordinated node(s) can be utilized to perform rendering of the computer-altered reality data.

In various implementations, at least one of the server(s) 112(A) and/or at least one of the server(s) 112(B) can be utilized as a primary node. The primary node, for example, can be utilized to manage and/or coordinate rendering of the computer-altered reality data being rendered by the primary node. Alternatively or additionally, the primary node, for example, can be utilized to manage and/or coordinate transmission and/or rendering of computer-altered reality data by at least one of any other server.

The primary node can be utilized to manage information (or "primary node information") associated with the primary node, and/or computer-altered reality data (e.g., extended reality (XR) data) 120. In some examples, rendering coordination information (or "coordination information"), which can include the primary node information, can be utilized to coordinate rendering associated with the computer-altered reality data.

In some examples, the computer-altered reality data being managed utilizing the primary node information and/or computer-altered reality data 120 can include the XR data, which can include AR data, VR data, MR data, or a combination thereof. The computer-altered reality data 120 can include computer-altered reality data associated with the user device(s) 102, rendered computer-altered reality data (e.g., the computer-altered reality data associated with the user device(s) 102 being rendered by the server(s) 112-118, as discussed below in further detail), blended computer-altered reality data (e.g., the computer-altered reality data associated with the user device(s) 102 being rendered by the server(s) 112-118 and blended by the local or edge 104, as discussed below in further detail), as discussed below in further detail), and/or one or more of any other types of computer-altered reality data.

In various examples, the primary node information can include various types of primary node information. The primary node information can include selection information, distribution information, coherence information, aggregation information, network information, orchestration information, one or more types of other information, or any combination thereof. The primary node information can be utilized to manage the primary node, including managing at least one of any of the various types of computer-altered reality data.

The selection information can include information utilized to perform one or more resource and/or server selections. In some examples, the selection information can be utilized to select one or more compute resources (e.g., at least one of the server(s) 112(B) and/or the server(s) 114-118, one or more other servers, at least one compute resource of at least one of any of the server(s) 112-118, and/or at least one compute resource of one or more other servers) and/or one or more nodes (e.g., one or more of the coordinated node(s) and/or one or more other types of nodes). The selection(s) performed based on the selection information can be utilized for rendering of the computer-altered reality data.

The selection information can be utilized by the primary node to identify which node (e.g., at least one node of the server(s) 112(B) and/or at least one node of the server(s) 114-118) can be utilized for rendering based on one or more labels associated with one or more sets (or "data set(s)") (or "segment(s)") (e.g., one or more data sets associated with one or more computer-altered reality items, respectively) of the computer-altered reality data. The node(s) (e.g., at least one node associated with the server(s) 112-118, one or more other servers, or any combination thereof, utilized for rendering), which can include various types of nodes, including at least one of the primary node and/or the coordinated node(s), can be identified as one or more rendering node(s) respectively. The label(s) can be identified based on priority information (e.g., priority information associated with the computer-altered reality data (e.g., information including one or more priorities associated with the computer-altered reality item(s)), as discussed below in further detail.

The selection information can be utilized by the primary node based on the priority information, which can be identified based on the priority data and/or the characteristics data, as discussed below in further detail. The priority information can include one or more priority(ies) (or "category(ies)") (or "data category(ies)") (or "item category(ies)") (or "item classification(s)") associated with the computer-altered reality data. By identifying priority(ies) associated with the computer-altered reality data, one or more sets of the computer-altered reality data being of a relatively higher priority can be rendered more quickly, and/or closer to the primary node and/or the user device(s) 102, with respect to one or more sets of the computer-altered reality data being of a relatively lower priority.

Utilizing the selection information by the primary node can include selecting the coordinated node(s), which will receive computer-altered reality data rendering information (or "rendering management information") (e.g., the rendering information, in the coordination and/or rendering information), and/or selecting the portion(s) of the computer-altered reality data to be received by the coordinated node(s). The selected computer-altered reality data can be sent, by the primary node, separate from, and/or along with, the rendering information (e.g., one or more rendering jobs, data associated with at least one of the computer-altered reality item(s), one or more executables, one or more portions of software data (e.g., software instructions, software code, etc.) needed by logic of the rendering node(s), and/or any other types of information the rendering node(s) utilize and/or require. In some examples, the rendering information can be utilized by the rendering node(s) to render the computer-altered reality item(s). In some examples, the selected computer-altered reality data can be integrated and transmitted with the rendering job(s).

Utilizing the selection information can include identifying (e.g., selecting) the rendering information and/or transmitting, to the coordinated node(s)), the rendering information. The rendering information can include information (or "rendered data oriented information"), separately and/or in combination with data (or "rendered data") (e.g., rendered computer-altered reality data) having been rendered. The rendered data can be utilized by the primary node and/or the user device(s) 102 to perform various functions utilized to identify (e.g., identify, determine, generated, produce, modify, etc.) blended data (e.g., or "final rendered data") (or "final data") (or a "final product") (e.g., final computer-altered reality data) (or "blended computer-altered reality data"). In some examples, the rendered data and/or the rendered data oriented information can be produced and transmitted to the primary node and/or the user device(s) 102 to be presented (e.g., blended and presented) by the user device(s) 102, as discussed below in further detail. The primary node and/or the user device(s) 102 can identify (e.g., identify, determine, generated, produce, modify, etc.) final data oriented information (or "blended data oriented information") associated with the blended data.

The rendering of the computer-altered reality data can be performed based on application information. The application information can include one or more binaries, logic (e.g., software logic) (e.g., game logic), one or more codes, and/or one or more other types of other information (e.g., one or more primitives, one or more texture maps, one or more texture maps, and so on, or any combination thereof), needed for the coordinated node(s) to render the computer-altered reality item(s) before sending data (or "rendered data") (or a "rendered outcome") (e.g., rendered computer-altered reality data) to the primary node.

In some examples, the individual ones of primitive(s) can include one or more sets of "fundamental language elements," serving as one or more portions of a "foundation" for a programming language associated with the primary node and/or the coordinated node(s). In some examples, individual ones of the texture map(s) and/or individual ones of the depth map(s) can include one or more corresponding representations of a three dimensional (3D) scene (e.g., any scene associated with the experience, as discussed below in further detail).

In various implementations, a depth map can be created based on one or more images of the user (e.g., a human body of the user) and calculating individual ones of one or more distances from each pixel to a camera through software. In such an example or another example, a texture map can be created by mapping a texture on a computer-generated graphic (e.g., individual ones of the image(s) of the user). Texture information, which may be separate from, integrated with, utilized along with, etc., the texture map, may include one or more of high frequency detail, one or more surface textures, one or more colors, and/or any other type of texture information.

Although the term "rendered data oriented information" and/or the term "rendered data" may refer, for simplicity and convenience of explanation, to information and/or data, respectively, produced based on the rendering operation(s), as discussed above in the current disclosure it is not limited as such. In some examples, rendered data oriented information can include one or more of any types of information being utilized for any portion of the rendering coordination prior to the rendering operation(s). In those or other examples, rendered data can include one or more of any types of data being utilized for any portion of the rendering coordination prior to the rendering operation(s).

Although the term "final information" and/or the term "final data" may refer, for simplicity and convenience of explanation, to information and/or data, respectively, utilized for one or more operations performed based on the blending operation(s), as discussed above in the current disclosure it is not limited as such. In some examples, final information (e.g., blended data oriented information) can include one or more of any types of information being utilized based on any portion of the rendering coordination subsequent to the rendering operation(s). In those or other examples, the final data can include one or more of any types of data based on any portion of the rendering coordination previous to the rendering operation(s). For example, the final data can include the data utilized to perform rendering, blending, transmitting (e.g., transmitting to the user device(s) 102 for presenting), presenting, etc., or any combination thereof.

Although the rendered data oriented information and/or the rendered data can be utilized by the coordinate node(s) based on the rendering operation(s) as discussed above in the current disclosure, it is not limited as such. In some examples, any of one or more portions (or "rendered data oriented information portion(s)") of the rendered data oriented information and/or the rendered data can be identified (e.g., identified, determined, generated, modified, etc.) by individual ones of the user device(s) 102. In those or those examples, individual ones of one or more portions of the rendering information (e.g., rendered data oriented information portion(s)) (e.g., the application logic, the game logic, etc.) can be identified based on one or more selections received via user input to one or more devices (e.g., the user device(s) 102, and/or one or more other devices associated with one or more developers).

In some examples, the item category(ies) associated with the set(s) of the computer-altered reality data, respectively, as discussed below in further detail, can be identified based on the rendered data oriented information. The item category(ies) can be identified based on user device information, as discussed below in further detail, primary node information, communication information (or "user device-primary node communication information") (e.g., information associated with one or more communications exchanged between the user device(s) 102 and the primary node), and/or any of one or more other types of coordination information.

Although individual ones of the rendered data oriented information portion(s) can be identified based on the selection(s) received via user input to the other device(s) associated with the developer(s), for example, as discussed above in the current disclosure, it is not limited as such. In some examples, any of one or more portions (or "rendered data oriented information portion(s)") of the rendered data oriented information and/or the rendered data can be identified (e.g., identified, determined, generated, modified, etc.) by individual ones of the server(s) 112-118.

The distribution information can be utilized to distribute the computer-altered reality data (e.g., the set(s) of the computer-altered reality data associated with the computer-altered reality item(s)). The computer-altered reality data can be distributed by the primary node and to the coordinated node(s) (e.g., the coordinated node(s) being utilized as the coordinated node(s) based on the distribution information.

The distribution information can include redistribution likelihood information. The redistribution likelihood information can include information related to a delay budget (e.g., how likely a delay in completing rendering will be incurred). For example, the redistribution likelihood information can enable the primary node, and/or a recipient (e.g., coordinated node) of a computer-altered reality data set associated with an item, to identify (e.g., decide) whether the distribution information indicating a request for rendering of the computer-altered reality data set can be met.

In some examples, the game logic may "set a delay budget" utilized for selected coordinated node(s) (e.g., individual ones of the coordinated node(s) selected to render any of the computer-altered reality data set(s)) to make decisions dynamically, and/or in real time (e.g., in pseudo real time), based on whether the coordinated node(s) predict they will be able to meet the delay budget. The coordinated node(s) can, for example, if one or more congestion levels indicate individual ones of the coordinated node(s) may be unable to meet a delay budget, redistribute, and/or communicate requests to the primary node for redistribution, of any of the computer-altered reality data set(s) to at least one other coordinated node. The delay budget may include one or more delay time thresholds for rendering of corresponding computer-altered reality data set(s).

In some examples, the redistribution likelihood information can be included in the distribution information to indicate a likelihood, based on compute resources associated with the coordinated node(s) receiving the computer-altered reality data to be rendered, and/or one or more other compute resources associated with one or more other coordinated node(s), of whether one or more tasks (e.g., one or more rendering tasks associated with the set(s) of the computer-altered reality data, respectively) will be performed by the coordinated node(s) receiving the computer-altered reality data.

In some examples, the coordinated node(s) receiving the computer-altered reality data may transfer a portion (e.g., a partial portion or an entire portion) of individual ones of the rendering task(s) based on the coordinated node(s) receiving the computer-altered reality data not having sufficient compute resources for completing the rendering tasks(s). In some examples, the compute resources initially associated with the coordinated node(s) receiving the computer-altered reality data may be sufficient, but modifications to availability of the compute resources may result in compute resources (e.g., current compute resources) being different from the initial compute resources.

In those or other examples, the modifications to the availability of the compute resources may result in the current compute resources being different from (e.g., less than or more than) the initial compute resources. For instance, with examples in which the modifications to the availability of the compute resources result in the current compute resources being less than the initial compute resources, the modifications may result in the current compute resources being insufficient for completing the portion of individual ones of the rendering task(s). The redistribution likelihood information can, prior to a time at which the compute resources become insufficient for completing the portion of individual ones of the rendering task(s), indicate a likelihood (e.g., a percentage chance) that the compute resources will be insufficient at some point in the future. In various examples, the redistribution likelihood information may include a likelihood (e.g., a percentage, another value of another type, etc., or any combination thereof) of whether the rendering task(s) will be completed by the coordinated node(s) receiving the computer-altered reality data, based on a likelihood, for example, of the compute resources changing to be lower than a threshold level of the compute resources sufficient for completing respective portions of any of the rendering task(s).

In some examples, the redistribution likelihood threshold may be determined (e.g., determined by a developer, determined by a game logic, etc.) based on whether one or more likelihoods (e.g., a likelihood of an item being a "non-bot" (e.g., a player, a protagonist, etc., in a "third-party view"), and/or a likelihood of an item having motion causing changes of position), are identified as being above a threshold likelihood. The likelihood(s) may be determined based on motion (e.g., random motion, unanticipated motion, relatively unpredictable motion, "player and/or protagonist like" motion, rapid motion, etc., or any combination thereof) of the item being identified as being in one or more of the category(ies) (e.g., any of the category(ies) associated with a non-bot, any of the category(ies) associated with motion that is likely to change positions with respect to the view point in a short amount of time, in a frequent manner, etc.).

The likelihood(s) (e.g., likelihood(s) received from the primary node) with respect to item(s) changing one or more respective distances from the view point, and/or one or more requests associated with the likelihood(s) (e.g., request(s) received from the primary node), can be utilized by the coordinated node(s) to redistribute the item(s) based on the likelihood(s) meeting or exceeding one or more corresponding threshold likelihood(s). In various examples, the likelihood(s) (e.g., likelihood(s) received from the primary node) with respect to item(s) changing one or more respective distances from the view point, and/or one or more requests associated with the likelihood(s) (e.g., request(s) received from the primary node), can be utilized by the coordinated node(s) to redistribute the item(s) based on the likelihood(s) being less than the corresponding threshold likelihood(s) can be utilized by the coordinated node(s) to "free up" compute resources (e.g., lower priority item(s), such as slow priority bots, slow moving objects, etc., and/or corresponding rendering tasks (e.g., one or more semi-permanent tasks, etc.) associated with rendering of the lower priority item(s), can be redistributed) should other higher priority item(s) requiring rendering be received by the coordinated node(s).

The coordination information (e.g., the distribution information) can be utilized for disjointed and/or distributed rendering of the computer-altered reality data. In some examples, the disjointed and/or distributed rendering can include the primary node forwarded a portion (e.g., a partial portion or an entire portion) of the coordination information to at least one of the coordinated node(s). In those or other examples, forwarding of some or all of the coordination information can include any portion of the coordination information being forwarded to all of the coordinated node(s).

The disjointed and/or distributed rendering can be performed via identifying being performed, by the primary node, of the coordinated node(s) to receive at least one of the portion(s) of the computer-altered reality data. For example, the primary node can identify a coordinated node (e.g., via a coordinated node identifier) to receive at least one of the set(s) of the computer-altered reality data, with which at least one respective item is associated; and, the primary node can identify the at least one of the set(s) of the computer-altered reality data (e.g., via at least one computer-altered reality data set identifier, with which at least one item indicated by at least one item identifier, respectively, is associated) to be forwarded to the identified coordinated node.

The coherence information can be managed by the primary node(s), which can synchronize the coherence information. For instance, with examples in which an experience associated with a user device 102 is beginning, as discussed below in further detail, a primary node can perform an initial synchronization associated with the experience. The coherence information being synchronized (e.g., such as by the primary node) can include the coherence information being synchronized among the coordinate node(s).

The coherence information can include information utilized to manage coherence (e.g., spatial coherence, temporal coherence, etc., or any combination thereof) of the computer-altered reality data (e.g., the set(s) of the computer-altered reality data associated with the computer-altered reality item(s)). In some examples, management of the coherence (e.g., the coherence information), which can be performed by the primary node, can include managing time information, frame information, universal coordinate information, global illumination (GI) information, one or more other types of coherence information, or any combination thereof. In those or other examples, management of the coherence information can include managing synchronization associated with the time information, the frame information, the universal coordinate information, the GI information, the other type(s) of coherence information, or any combination thereof.

The coherence information can include the time information, which can include one or more time identifiers (e.g., one or more identifiers indicating one or more times) associated with the computer-altered reality data. For example, one or more communications, which can include one or more signals (e.g., a signal) (or "user device signal(s)") transmitted by a user device 102 and to at least one of the server(s) 112 (e.g., at least one of the server(s) 112(A) being utilized, and/or to be utilized, as the primary node, such as a server identified from among the server(s) 112(A)), can include computer-altered reality data (e.g., computer-altered reality data to be rendered); and any of the user device signal(s) can further include a time identifier (e.g., time identifier, which can indicate a time, and can include a year, a day, an hour, a minute, a second, a millisecond, a micro-second, or any other time increment, or any combination thereof) associated with the computer-altered reality data. The time can be utilized as a reference point (or "reference value") (e.g., a reference time) at which the computer-altered reality data is identified, captured, generated, transmitted, etc., or any combination thereof, by the user device 102.

The coherence information can include the frame information, which can include one or more frame identifiers (e.g., one or more identifiers indicating one or more frames) associated with the computer-altered reality data. As in the above example or another example, any of the user device signal(s) transmitted by a user device 102 can include computer-altered reality data (e.g., computer-altered reality data to be rendered); and the user device signal can further include a frame identifier (e.g., a computer-altered reality frame) (e.g., a frame identifier indicating a frame) associated with the computer-altered reality data. The frame can be utilized as a reference point (or "reference value") (e.g., a reference time) at which the computer-altered reality data is identified, captured, generated, transmitted, etc., or any combination thereof, by the user device 102.

The coherence information can include the universal coordinate information, which can include one or more universal coordinate identifiers (e.g., one or more identifiers indicating one or more one or more universal coordinates) associated with the computer-altered reality data. As in the above example or another example, the user device signal transmitted by a user device 102 can include computer-altered reality data (e.g., computer-altered reality data to be rendered); and the user device signal can further include a universal coordinate identifier (e.g., a universal coordinate identifier indicating a universal coordinate) associated with the computer-altered reality data.

The coherence information can indicate, via the universal coordinate identifier, the universal coordinate, which can be utilized as a reference point (or "reference value") (e.g., a reference time) at which the computer-altered reality data is identified, captured, generated, transmitted, etc., or any combination thereof, by the user device 102. For example, the universal coordinate includes one or more coordinates (e.g., an x-value coordinate (or "x-value"), a y-value coordinate (or "y-value"), a z-value coordinate (or "z-value"), or any combination thereof) associated with a location of a user device 102 (e.g., a location, such as a "real world" location) (e.g., a location of the user of the user device 102). As in the example above or another example, the coordinate(s), which can be identified by the user device 102, can be transmitted by the user device 102 in the signal to the primary node.

The coherence information can include the GI information, which can include one or more GI identifiers (e.g., one or more identifiers indicating one or more one or more GI values (or "GIs")) associated with the computer-altered reality data. As in the above example or another example, the signal transmitted by a user device 102 can include computer-altered reality data (e.g., computer-altered reality data to be rendered); and the signal can further include a GI identifier (e.g., a GI identifier indicating a GI value (or "GI")) associated with the computer-altered reality data.

In some examples, the GI information can be associated with any of the portion(s) of the computer-altered reality data, respectively. In those or other examples, the GI information can be associated with any of the set(s) of the computer-altered reality data, respectively.

In some examples, the GI information can include one or more characteristics (e.g., one or more illumination characteristics) of illumination. In those or other examples, the illumination characteristic(s) can include one or more levels (e.g., one or more values) associated with a strength, a magnitude, an intensity, a direction, an angle, a diffusion, one or more of any other illumination characteristics, or any combination thereof.

One or more portions (or "coherence information portion(s)") of the coherence information (e.g., the selection information, the distribution information, the GI information, one or more of any other types of coherence information, or any combination thereof) can be synchronized, via a synchronization operation (or "synchronization"), based on synchronization information, which can be included in the coherence information. The synchronization information can be utilized to a time and/or a frame for synchronized rendering of the computer-altered reality data. Additionally or alternatively, the synchronization information can be utilized to synchronize any of the coherence information portion(s) between the primary node and any of the coordinated node(s), between any of the coordinated node(s), between any of the primary node, the coordinated node(s), and/or any other nodes, or any combination thereof.

The aggregation information can be identified by the primary node and utilized by the primary node to identify one or more locations (or "blending location(s)") utilized for blending of the rendered computer-altered reality data. In various implementations, the primary node identifying the location(s) can identify whether to blend, and/or to pass through, the rendered computer-altered reality data (e.g., the computer-altered reality data being rendered by the coordinated node(s) and being communicated to the primary node). The primary node information (e.g., the aggregation information, and/or any other information of the primary node information) can include blending location information (e.g., one or more blending mode flags (or "blending flag(s)") (or "primary node blending flag(s)") having values to indicate the blending being performed by the primary node or the user device(s) 102). For example, at least one of the blending flag(s) associated with at least one portion of the computer-altered reality data (e.g., at least one portion of the computer-altered reality data being transmitted by the primary node and rendered by the coordinated node(s)), can be set to indicate the blending (e.g., the blending of the at least one portion of the rendered computer-altered reality data being transmitted by the coordinated node(s), and received from the coordinated node(s)) is to be performed by the primary node.

Alternatively or additionally, based on the blending location information in the aggregation information, at least one of the blending flag(s) that is associated with at least one portion of the rendered computer-altered reality data (e.g., the computer-altered reality data being transmitted by the primary node, and rendered by the coordinated node(s)) and that is not set, can be utilized. The at least one of the blending flag(s) being set may indicate the blending of the at least one portion of the rendered computer-altered reality data is to be performed by a user device 102 (e.g., a user device 102 that is associated with the at least one portion of the computer-altered reality data).

The aggregation information can be utilized to identify the at least one portion of the computer-altered reality data is to be rendered by the primary node or the user device(s) 102 based on the at least one of the blending flag(s). In various implementations, the primary node may have a blending mode. For instance, with examples in which the primary node may has a blending mode, the blending mode may identified based on a blending flag (e.g., a single blending mode flag may be used to control the blending mode, alternatively or additionally to one or more blending flags being utilized for all of (e.g., an entire portion of) the rendered computer-altered reality data). In those examples or other examples, the blending mode flag being set may identify the blending mode associated with primary node as being activated. In those examples or other examples, the blending mode flag not being set may identify the blending mode associated with primary node as not being activated (e.g., being deactivated).

Although the blending flag(s) and/or the blending mode flag, which may be included in the aggregation information, may be utilized as discussed above in the current disclosure, it is not limited as such. In some examples, the blending mode flag may apply to all of the rendered computer-altered reality data regardless any of the blending flag(s) being identified, being set, or not being set. In those or other examples, the blending mode flag may identify the blending mode of the mast node regardless of any of the blending flag(s). For example, all items may be rendered by the primary node, or passed through to a user device 102, based on a value (e.g., set or not set) of the primary node flag.

However, in alternative examples, the blending mode flag may be utilized as an initial blending mode flag for all of the rendered computer-altered reality data, with any of the blending flag(s) being utilized to overrule the blending mode flag for the respective portions of the rendered computer-altered reality data, based on the blending flag(s) being set, or not being set. For example, all items may be rendered by the primary node, or passed through to a user device 102, based on a value (e.g., set or not set) of the primary node flag, except with some items being rendered, or passed through, according to respective flags associated with those items.

The aggregation information can be utilized by the primary node to blend the rendered computer-altered reality data. In some examples, blending by the primary node (e.g., the primary node operating in the blending mode) can be performed to blend the rendered computer-altered reality data, based on at least one of the set(s) of the rendered computer-altered reality data being generated by, and received from, the coordinated node(s), and/or, possibly, based on at least one of the set(s) of the rendered computer-altered reality being generated by the primary node.

The aggregation information being utilized by the primary node can include the primary node blending portions of the rendered computer-altered reality data (e.g., foreground data), and ignoring one or more other portions of the computer-altered reality data (e.g., currently unrendered data) (e.g., background data). The primary node can send, to the user device(s) 102, the blended computer-altered reality data (e.g., the rendered data and, possibly, the data not needing to be rendered, if necessary, since the user device(s) 102 may reuse previous background data, which the local or edge server(s) 118 can utilize to determine to not send some of the data if it is not necessary to do so).

The aggregation information being utilized by the primary node can include the primary node identifying, in the signals that include the blended computer-altered reality data to the user device(s) 102, information about whether the user device(s) 102 are to reuse previous data, such as for final blending, as discussed below in further detail. For example, the signals can include one or more identifiers associated with data (e.g., current and/or previous data) that the primary node identifies as being reusable (e.g., background data not currently needed to be rendered). The identifier(s) associated with the data (e.g., the current and/or previous data) can be utilized by the user device(s) 102 to reuse the background data, for example, which can save network bandwidth.

The aggregation information being utilized by the primary node to identify the blending node identifier(s) can include the primary node(s) being identified as the blending node(s). For example, a primary node, which can be identified as a blending node, can blend the rendered computer-altered reality data and other data (e.g., data to be reused) (e.g., one or more portions of data, such as current and/or previous data not needing to be rendered along with the rendered computer-altered reality data) (e.g., the background data). The primary node can blend the rendered computer-altered reality data based on the blending information.

The blending of the rendered computer-altered reality data by the primary node, as the blending node, can include the primary node can identifying one or more portions (e.g., individual ones of the portion(s), including one or more data sets with which one or more items are respectively associated) of the data to be reused. The primary node can perform the blending of the rendered computer-altered reality data (e.g., the rendered computer-altered reality data received from the coordinated node(s)) and the portion(s) of the data to be reused (e.g., the data not needing to be rendered).

The aggregation information being utilized by the primary node to identify the primary node as the blending node can be further utilized by the primary node to transmit (e.g., stream, such as "pixel stream"), to the user device(s) 102, the blended computer-altered reality data (e.g., the user device(s) 102 pushing presented data to the display based on the blended computer-altered reality data). The user device(s) 102 can receive, from the primary node, the blended computer-altered reality data. The user device(s) can generate one or more final compositions of the computer-altered reality data. The final composition(s) can be generated by the user device 102 performing refining (or "recompositing") (or "compositing") (or "finalizing") (or "bundling") (or "polishing") of the blended computer-altered reality data received from the primary node.

The refining can include compositing and/or recompositing the blended computer-altered reality data received from the primary node. In the previous example or another example, the user device 102 can perform the refining based on information (or "refining information") (e.g., refining instructions) utilized for refining, the refining information being received from the primary device. The primary device can send, in combination with or separate from blended computer-altered reality data, the refining information. The refining information can include information (or "reuse information") (e.g., instructions including the identifier(s) of the data to be reused) instructing the user device 102 to reuse one or more portions of the computer-altered reality data.

The portion(s) of the computer-altered reality data to be reused by the user device(s) 102 can include various types of data (e.g., the current and/or previous computer-altered reality data not needing to be rendered) (e.g., data associated with objects with which the user is not interacting, and/or objects with slow and/or no motion). The refining can be performed by the user device(s) based on information (e.g., the refining information) stored in one or more storages (e.g., one or more caches, one or more memories, etc., or any combination thereof) of the user device(s).

For example, a user device 102 can perform refining, which can include processing (e.g., refining) in relatively simpler way, in comparison to the blending performed by the primary node. The refining final blending can include the user device 102 performing refining of the computer-altered reality data (e.g., the item(s) represented by the computer-altered reality data). The user device 102, via the final blending, can perform operations associated with one or more relatively simple "decisions," such as to occlude one or more previous rendered versions of an item with one or more former versions of the item in a new position (e.g., a position closer to the user device 102, based on motion of the item causing the item to be closer to the user device 102).

In some examples, occluding of the previous rendered versions can include "time warping," as discussed below in further detail, the previous rendered versions to the new positions. In those or other examples, "time warping" of the previous rendered versions to the new positions can be performed without occlusion.

One or more frame rates can be utilized by the primary node to coordinate (e.g., control) the rendering of the computer-altered reality data. The frame rate(s) can be identified based on the computer-altered reality data needing to be rendered. For example, a frame rate utilized for the rendering (e.g., rendering, which can include continuous, ongoing, rendering) can be identified based on an item associated with a highest level of activity and/or a highest level of motion. The item can be identified, based on highest frame rate being required for rendering of the item to be presented "smoothly" and "naturally" to a user of a user device 102.

Although individual ones of the various level(s) of inter-activity and/or individual ones of the various level(s) of motion can be indicated in, and/or utilized to identify various portions of the coordination information (e.g., the rendering information and/or any other information of any type in the coordination information), as discussed above in the current disclosure, it is not limited as such. In some examples, individual ones of one or more levels of activity can include a level associated with rapidity, frequency, magnitude, etc., or any combination thereof, of activity (e.g., interactivity) between the item and at least one other item (e.g., any other portion of the experience). In those or other examples, individual ones of one or more levels of motion can include a level associated with rapidity, frequency, magnitude, etc., or any combination thereof, of motion.

One or more portions of computer-altered reality data can be rendered at different respective rates. In some examples, one or more sets (e.g., one or more item related data sets associated, respectively, with one or more items) of the computer-altered reality data, which can be identified as needing to be rendered at the highest frame rate (e.g., 75 frames/second, 90 frames/second, etc.), can be rendered at the highest frame rate. In various implementations, individual ones of the portions computer-altered reality data can include at least one of the one or more set(s) of the computer-altered reality data.

In those or other examples, one or more other sets (e.g., one or more item related data sets associated with one or more respective items) of the computer-altered reality data, which can be identified as not needing to be rendered at the highest frame rate, can be rendered at one or more respective frame rates identified for the other set(s). The other portion(s) not having been rendered, at a time at which blending is performed with the portion(s) (e.g., the item related data set(s)) of the computer-altered reality data having been rendered, can be blended as unrendered computer-altered reality data with the rendered computer-altered reality data.

For instance, with cases in which at least one set of computer-altered reality data is identified, a portion of computer-altered reality data can include the at least one set of computer-altered reality data, based on one or more similarities between at least one item with which the at least one set of computer-altered reality data is associated. In various examples, the similarity (ies) can include any number of similarities associated with any types of item characteristics (e.g., type, motion, item-related activity, item-related user interactivity, size, orientation, location, and so on, or any combination thereof) and/or item classifications, as discussed below in further detail.

The primary node can perform blending of the computer-altered reality data based on the rendering being performed at intervals according to the highest frame rate, for example. One or more portions (e.g., one or more highest priority sets) of the computer-altered reality data being rendered at the highest frame rate can be blended with the one or more other unrendered portions (e.g., one or more other "less than highest" priority sets, including one or more relatively lower priority sets) of the computer-altered reality data based on a current time matching a time characteristic (e.g., a predetermined time) (e.g., a time utilized for rendering the highest priority set(s) of the computer-altered reality data at the highest frame rate). The times for rendering can be identified based on one or more time intervals (e.g., a time interval measured from a time (or "previous time") utilized to render the highest priority set(s)).

At one or more other times, the other set(s) (e.g., the "less than highest" priority set(s)) can be rendered at their respective frame rate(s) based on a current time matching any of one or more other time characteristics, such as one or more other times (e.g., one or more other predetermined times) (e.g., one or more other times utilized for rendering the "less than highest" priority set(s) of the computer-altered reality data at one or more "less than highest" frame rates, including one or more relatively lower frame rates). At the other time(s), one or more of various types of sets (e.g., the highest priority set(s) and/or at least one of the "less than highest" priority set(s) associated with rendering at the other time(s)) can be blended. The other time(s) can be identified based on one or more time intervals (e.g., one or more time intervals from one or more times (or "previous time(s)") utilized to render the one or more "less than highest" priority set(s)).

For example, a highest priority set can be rendered at a time interval (or "highest priority time interval") (e.g., every 20 milliseconds), and a "less than highest" priority set can be rendered at a time interval (or "less than highest priority time interval") (e.g., every 60 milliseconds). In such an example or another example, both the highest priority set and the "less than highest" priority set can be rendered every 60 milliseconds, based on the highest priority set being rendered every 20 milliseconds.

As a hypothetical example, the primary node can perform blending based on rendered computer-altered reality data. The primary node can identify one or more frames being updated and received, as one or more updated frames (e.g., one or more rendered frames) (e.g., the rendered set(s) of the compute-altered reality data), from the coordinated node(s). The updated frame(s) being identified can include the update frame(s) being received and/or determined as being received. In some examples, the updated frame(s) may be received (e.g., the updated frame(s) may be received by individual ones of the user device(s) 102) based on reoccurring, continuous, ongoing, updates (e.g., rendering) at one or more respective intervals. In those or other examples, at least one of the updated frame(s) may be received at one or more different frequencies than at least one other of the updated frame(s). The frequency(ies), as discussed below in further detail, at which the updated frame(s) are received may coincide, for example, with the frequency(ies) at which the updated frame(s) are generated (e.g., with the frequency(ies) at which frame(s) are updated, to generate the updated frame(s)).

In the hypothetical example, the blending being performed at the primary node can be based on the primary node receiving the updated frame(s) from the coordinated node(s), and blending, as one or more blended frames, the updated frame(s). The primary node can send the blended frame(s), and, possibly, send a frame and depth map along with the blended frame(s), to the user device 102 for local blending. While compute resources of the user device 102 may be required to perform refining of the blended frames, which may possibly place some resulting demands on the computing processing unit (CPU) of the user device 102, and/or place some resulting demands on the power supply of the user device 102, network resources (e.g., the BW) availabilities may increase efficiencies on the network utilized to exchange any of the data (e.g., the frame(s), the updated frame(s), etc.)

In comparison to existing technology, which may render all data at a single location (e.g., a single server), a user device (102), as in the hypothetical example, blending the rendered frame(s) (e.g., rendered frame(s) associated with an experience for the user device 102), may result in lower levels of compute power being expended by the user device (102). While OTA bandwidth (BW) may be required for transmitting the blended frame(s) to the user device 102, based on the primary node performing the blending, and, possibly, transmitting the blended frame(s) at any of one or more intervals (e.g., an interval of 75 frames/second, an interval of 90 frames/second, etc.).

In the hypothetical example, the blending can be performed (e.g., constantly and/or continuously performed) by the primary node even though one or more of various blended frames are generated notwithstanding at least one rendered set associated with at least one of the set(s) of the computer-altered reality data not being received. For example, the at least one rendered set may not be generated by, and/or received from, a coordinated node based on a period of time between a previous rendering time and a current time not being greater than an interval (e.g., a rendering interval) set for rendering the set of computer-altered reality data. However, the primary node may perform blending based on one or more other intervals (e.g., a rendering interval associated with a most frequently updated cadence for another set of the computer-altered reality data.

In the hypothetical example, the primary node can blend the rendered computer-altered reality data and transmit the blended computer-altered reality data to the user device 102. The user device 102 can present, via a display, the blended computer-altered reality data (e.g., based on the user device 102 performing refining of the blended computer-altered reality data). Although there may be one or more delays over the network based on the transmitting of the blended computer-altered reality data, the compute power being expended by the user device 102 may be decreased.

In the hypothetical example, the primary node can blend the rendered computer-altered reality data, such as, for example, a number (e.g., 1, 2, 5, 10, etc.) of the rendered set(s) of the computer altered reality data (e.g., the rendered computer altered reality data set(s) associated with "rendered item(s)," respectively), with which a relative number of the item(s) in a "complete frame view" (e.g., a "frame view" of a frame associated with the experience) are associated. The primary node, which can utilize the rendered set(s) of the computer altered reality data, in a "world view," such as a 3D frame, can populate and superimpose one or more other set(s) of the computer altered reality data (e.g., unrendered set(s) of the computer altered reality data) into the "world view" (e.g., the 3D frame).

Blending the rendered computer altered reality data set(s) can include blending individual ones of one or more frames showing "two dimensional (2D) versions" of a "3D world" from a camera view (or "view point") (e.g., a "view" from a user device 102). Individual ones of the frame(s) can be associated with (e.g., can include) a rendered computer altered reality data set received from a coordinated node, for example. A depth map can be utilized during the blending to "put" individual ones of the rendered computer altered reality data set(s) (e.g., each of the rendered computer altered reality data set(s)), which may be in "an x-y plane," in a "proper order" (e.g., via a z axis), to enable occlusion. The rendered computer altered reality data set(s) may be put in the proper order to enable occlusion during blending of all of the rendered computer altered reality data set(s). A final blended frame based on the blending being performed may include all of the rendered computer altered reality data set(s), in 2D, with a "perspective view" and with "proper occlusion."

The primary node can produce the blended set of the computer-altered reality data (e.g., the blended set being time adjusted, frame adjusted, and/or adjusted in any other way for a "full picture," etc.) based on "time warping." The primary node can "time warp" at least one portion of the computer-altered reality data (e.g., at least one item oriented computer-altered reality data set of individual ones of the at least one portion) with an "eye box" (e.g., an "eye box" including a view being larger than a view utilized by the user) (e.g., an "eye box" can include 110%, 120%, 130%, 140%, etc., of a camera view, with the camera view being established as having a 100% view, for example), as discussed below in further detail. The "time warping" can be performed based on a pose (e.g., a current pose) associated with a user device 102 to be utilized to display the blended computer-altered reality data, as discussed below in further detail.

Although "time warping" may be performed as discussed above in the disclosure, it is not limited as such. In some examples, the "time warping" can be performed prior to, contemporaneous to, and/or subsequent to, the blending. Any "time warping" (e.g., intermediate "time warping") can be performed on an individual item can be performed prior to blending. Any "time warping" can be performed on a "world view" (e.g., a whole experience, a "whole world") (e.g., all of the item(s) to be transmitted to a user device 102) can be performed subsequent to blending. Any of at least one type of the "time warping" as discussed throughout the disclosure can be utilized for purposes of implementing any of the techniques as discussed herein.

Although the frame(s) can be received and updated, as the updated frame(s), as discussed above in the current disclosure, it is not limited as such. In some examples, any of the set(s) of the compute-altered reality data being transmitted to, and/or rendered by, the coordinated node(s) can be integrated with, and/or received separately from, in combination with, etc., the frame(s). In those or other examples, any of the rendered set(s) of the compute-altered reality data being received from the coordinated node(s) can be integrated with, and/or received separately from, in combination with, etc., the updated frame(s) from the coordinated node(s).

The rendered set(s) of the compute-altered reality data can be received by the primary node and from the coordinated node(s). The blended computer-altered reality data portion(s) (e.g., the blended computer-altered reality data set(s) in individual ones of the portion(s)) can be transmitted by the primary node and to the user device 102. The transmitting (e.g., transmitting to a user device 102) of the blended computer-altered reality data portion(s) can be performed via any of one or more transmission/media technologies/protocols (e.g., h.264/265).

The final composition(s) of the computer-altered reality data can be generated and presented to the users. The final composition(s) of the computer-altered reality data can be presented by the user device(s) 102, and to the user(s) of the user device(s) 102. The user device 102 can receive, from the primary node, the rendered computer-altered reality data, and generate the final composition(s) of the computer-altered reality data, as discussed above in further detail. For example, presenting a final composition can include presenting, by a user device 102 and via the final composition, the item(s) represented by the blended computer-altered reality data.

Alternatively or additionally to the primary node blending the at least one portion of the rendered computer-altered reality data, the aggregation information being utilized by the primary node to identify the blending node identifier(s) can include the user device(s) 102 being identified as one or more blending device(s) for one or more of various types of data. For example, a user device 102 can be utilized as a blending device (e.g., a blending node) to blend some or all of the rendered computer-altered reality data.

The aggregation information being utilized by the primary node to identify the user device(s) 102 as the blending device(s) can include the primary node passing through at least one portion of the rendered computer-altered reality data (e.g., at least one portion of computer-altered reality data being rendered by the coordinated node(s) and being communicated to the primary node). In some examples, based on the blending flag(s) not being set, and/or the blending mode flag not being set, the primary node can pass through, to the user device(s) 102, the at least one respective portion of the rendered computer-altered reality data to be blended by the user device(s) 102.

In some examples, the at least one portion of the rendered computer-altered reality data being passed through to the user device(s) 102 can be blended by the user device(s) 102, in a similar way as for blending being performed by the primary node of the at least one portion of the rendered computer-altered reality data, as discussed above in further detail. Based on the user device(s) 102 blending the at least one portion of the rendered computer-altered reality data, the user device(s) 102 can store and/or process the blended computer-altered reality data.

In a hypothetical example, a user device 102, instead of the primary node, can receive and blend the rendered computer-altered reality data, such as, for example, a number (e.g., 1, 2, 5, 10, etc.) of the rendered set(s) of the computer altered reality data, with which a relative number of the item(s) in a "complete frame view" (e.g., a "frame view" of a frame associated with the experience) are associated. The user device 102, which can utilize the rendered set(s) of the computer altered reality data, in a "world view," such as a 3D frame, can populate and superimpose one or more other set(s) of the computer altered reality data (e.g., unrendered set(s) of the computer altered reality data) into the "world view" (e.g., the 3D frame).

In various examples, the user device 102 being utilized, instead of the primary node, to blend the rendered computer-altered reality data, can produce the blended set of the computer-altered reality data (e.g., the blended set being time adjusted, frame adjusted, and/or adjusted in any other way for a "full picture," etc.) based on "time warping." The user device 102 can "time warp" at least one portion of the computer-altered reality data (e.g., at least one item oriented computer-altered reality data set of individual ones of the at least one portion) with an "eye box" (e.g., an "eye box" including a view being larger than a view utilized by the user) (e.g., an "eye box" can include 110%, 120%, 130%, 140%, etc., of a camera view, with the camera view being established as having a 100% view, for example), as discussed below in further detail. The "time warping" can be performed based on a pose (e.g., a current pose) associated with a user device 102 to be utilized to display the blended computer-altered reality data, as discussed below in further detail.

In the hypothetical example, the user device 102 can blend the rendered frame(s) (e.g., the rendered set(s) of the compute-altered reality data being relayed, instead of blended, by the primary node). In comparison to existing technology, which may render all data at a single location (e.g., a single server), the primary node blending the rendered frame(s) (e.g., rendered frame(s) associated with an experience for a user device 102), may result in lower levels of OTA BW. To reduce congestion, the blending can be performed at the user device 102, such as if there is a problem with OTA BW (e.g., if there is a larger number of user devices in an area (e.g., an area that is confined, small, etc.)). The reduced congestion may provide greater BW for use by one or more others of the user device(s) 102.

In the hypothetical example, the user device 102 can generate one or more final compositions of the computer-altered reality data, in a similar way as for the final composition(s) being generated utilizing the blended computer-altered reality data received from the primary node, as discussed above in further detail. The final composition(s) of the computer-altered reality data can be presented by the user device(s) 102 to the user(s) of the user device(s) 102. For example, presenting a final composition can include presenting, by a user device 102 and via the final composition, the item(s) represented by the blended computer-altered reality data.

The primary node information being utilized by the primary node can include the primary node identifying the network information. The network information can include application program interface (API) information (e.g., one or more APIs). In some examples, the API information, and/or other information (e.g., any other network information utilized to provision the primary node, as discussed below) in the network information, can include location information (or "primary node location information")), quality on demand (QoD) information, and/or edge cloud information, associated with the primary node.

The API information, the location information, the QoD information, and/or the edge cloud information can be utilized by the primary node to coordinate the rendering. For example, at least one portion of the network information can be received from the service provider network, can be utilized by the primary node to coordinate the computer-altered reality data rendering (e.g., XR rendering). Developers of the user device(s) 102 can utilize the primary node information (e.g., information associate with services (e.g., XR service) to develop software (e.g., one or more XR games, and/or software associated therewith). The API(s) can be identified (e.g., accessed previously stored information), requested, obtained, and/or received (e.g., requested information being received), and/or retrieved (e.g., unrequested information being retrieved)), by the user device(s) 102 via the network(s) (e.g., the 5G network(s).

The network information can include, and/or be utilized to provide, functions and/or services offered and/or guaranteed by one or more service provider(s) of the service provider network(s). For example, one or more functions, and/or one or more services can be provided by a service provider, which can include an owner of an application experience (e.g., an XR game). The service provider can guarantee provisioning and/or providing of the primary node and/or the coordinate node(s). The service provider can enable the primary node to be assigned for a user device 102.

The service provider(s) (e.g., the service provider network(s)) can enable provisioning, and/or be utilized to provision, the primary node as a node on the service provider network being closest to a user device 102. Identifying an edge (e.g., the local or edge 104) can be performed prior to the primary node being assigned to a server. The information identifying the local or edge 104 can be provided by the service provider network and to the user device 102. The user device 102, based on the information identifying the local or edge 104, can identify a location (e.g., a server identifier associated with a server, and/or a location identifier associate with a location of a server) for provisioning of the primary node.

One or more requests (e.g., one or more primary node provisioning requests) (e.g., one or more premium content requests) associated with the user device(s) 102 can be utilized to provision one or more primary nodes. For example, the service provider network can provision (e.g., instantiate, start, etc.) the primary node based on a primary node provisioning request from a user device. Based on the primary node being instantiated (e.g., generated as an initial instance), a mechanism (e.g., service provider service guaranteeing software) can be utilized by the service provider network for providing an application (e.g., an XR application) to a user device 102. The mechanism can be utilized by the service provider to determine that a guaranteeing service is needed for content (e.g., premium content).

In some examples, coordinating the rendering using the coordinated device(s) can be based on a premium content request (e.g., a request via the group computer-altered reality data (e.g., group XR data)/rendering information 124, as discussed below). The service provider network can utilize the QoD information to generate a connection that is not a permanent connection, based on the connection being set up on demand (e.g., set up in response to the premium content request). The connection can be utilized to connect the user device 102 to the primary node for delivery of the XR application, the XR content, and so on. The delivery of the XR application, the XR content, and so on, can be performed by the service provider network when the application is requested by the user device, based on the premium content request.

A level of quality can be identified, via the premium content request (e.g., the premium content request can include information (or "quality level information") (or "quality information"), which can include and/or identify one or more levels of quality). The quality information can be utilized by the service provider network and/or the primary node to identify and/or set up the connection. Various portions of the primary node information (e.g., a frame rate (e.g., a frame rate being identified and/or set as the highest frame rate), a resolution, etc.), can be identified via the premium content request (e.g., the level of quality, and/or other information in the quality information associated therewith).

Information (e.g., the edge cloud information) in the network information, which can be identified by the primary node(s), can be utilized by the primary node(s) to identify and/or guarantee one or more services (e.g., one or more services associated with one or more work flows can be guaranteed by the primary node and for the user device(s) 102, the work flows being associated with one or more XR applications utilized by the user device(s) 102). For example, the edge cloud information can be utilized by a primary node to guarantee service for an XR application for a user device 102. Information (e.g., logic, software, etc.) in the network(s) (e.g., in the external network (e.g., a public cloud)) can be utilized by the service provider to generate the edge cloud information (e.g., the local or edge 104) (e.g., edge information, including information associated with the local or edge 104). The logic in the external cloud can be utilized by a service provider (e.g., a service provider network) based on a request (e.g., a connection request, a premium content request, etc.) from a user device 102.

Based on the network information, the service provider (e.g., the service provider network) can utilize the logic on the public cloud to identify information based on one or more locations (or "user device location(s)") of the user device(s) 102. For example, information identified by a service provider network can include a location associated with a user device 102 to be used for sending a media access control (MAC) address to the user device 102. Additionally or alternatively to the user device location being identified by the service provider network (e.g., while the user device location is being identified by the service provider network), the user device 102 can request an operator (e.g., a service provider network) to provide quality of service (QOS) information for a connection. The service provider network can orchestrate any and/or all of the above discussed functions to instantiate the local or edge 104.

Instantiating the local or edge 104 based on the network information can include establishing, via a server (e.g., one of the server(s) 112(A)), the local or edge 104, not only for compute resources, but also to orchestrate an entire service flow for the connection (e.g., setting up any resources for providing the XR application, any associated rendering, and/or any associated coordination of the rendering). Identifying the local or edge 104 can be established by the service provider network, and the local or edge 104 can be utilized to instantiate the primary node.

The orchestration information, which can be included in the network information, and which can be identified (e.g., identified, determined, generated, utilized, modified, etc.) by the primary node(s), can be utilized by the network(s) (e.g., the service provider network) to identify (e.g., identify, determine, select, etc.) one or more locations (or "primary node location(s)") in which the primary node(s) can "reside." The orchestration information can be utilized by the primary node to perform service orchestration. The service orchestration can include selecting the coordinated node(s) for rendering the respective sets of computer-altered reality data associated with the respective item(s).

Based on the network information, the primary node location(s) can be identified (e.g., by the service provider network) via one or more location identifiers (or "primary node location identifier(s)") as the primary node location(s) at which the primary node(s) will be, is, and/or has been, instantiated. The primary node location(s) can include one or more servers and/or one or portions of individual ones of the server(s). The orchestration information can be utilized by the service provider network to identify the user device location(s) associated with the user device(s) 102 (e.g., one or more locations at which one or more users (or "clients") of the user device(s) 102 are located (e.g., one or more locations at which the user device(s) 102 are located). The primary node(s) can identify the primary node location(s) and/or the user device location(s).

As a hypothetical example, operation (e.g., initial operation) of the primary node(s), based on the coordination information, which can include various types of information, such as the primary node information (e.g., based on service orchestration being performed) (e.g., based on the API(s) being identified, retrieved, obtained, etc., and/or based on the service orchestration being completed), can include identifying (e.g., accessing (e.g., accessing already stored information), requesting, obtaining, and/or receiving (e.g., receiving requested information), and/or retrieving (e.g., retrieving unrequested information)) one or more item oriented libraries (e.g., one or more entire item oriented libraries, one or more object oriented libraries, one or more entire object oriented libraries, and so on, or any combination thereof). For example, an item library being retrieved, which can include the entire item library, can include information associated with any and/or all of the item(s) associated with an experience utilized by a user device 102.

In some examples, individual ones of the item library (ies) can be utilized as a repository of information associated with the computer-altered reality data set(s) associated with the respective item(s). In those or other example, the primary node can access the repository (ies) to retrieve any of one or more types of information (e.g., the coordination information, such as the primary node information, etc.) utilized for the coordination (e.g., the rendering, the blending, etc., or any combination thereof).

In the hypothetical example, the operation of primary node(s) can include the item library (ies) being distributed to the primary node, the item library (ies) being distributed with the computer-altered reality data (e.g., the set(s) of the computer-altered reality data associated with the respective item(s)). The item library (ies) being identified can include one or more libraries, which can include the item(s) with which the set(s) of the computer-altered reality data are respectively associated.

In the hypothetical example, the operation of primary node(s) can include utilizing the item library (ies), based on the set(s) of the computer-altered reality data respectively associated the item(s) being instantiated, and based on the library (ies) being identified using the instantiated set(s) of the computer-altered reality data. For example, one or more instantiated sets of computer-altered reality data in a library can be utilized to by a primary node to coordinate rendering, which can include the primary node identifying to which coordinated node(s) to send one or more jobs (or "task(s)") for rendering of the set(s) of the computer-altered reality data.

In the hypothetical example, the primary node(s) can be operated to identify, alternatively or additionally to the set(s) of the computer-altered reality data, one or more of time information (e.g., information including one or more time identifiers, which can indicate one or more times) or spatial information (or "frame information") (e.g., spatial coordinate frame information, which can include one or more identifiers indicating one or more spatial coordinate frames) (e.g., one or more spatial coordinate frames (e.g., one or more three dimensional (3D) spatial coordinate frames), which can include one or more coordinates associated with individual ones of one or more locations of the user device(s) 102). For example, the time information can include, for an experience for a user device 102, a time identifier (e.g., a "time 0") associated with an initial time frame. The initial time frame can be associated with a beginning, a start, an initial operation, etc., associated with the experience (e.g., an application, a game, etc. with which the computer-altered reality data is associated).

In the hypothetical example, the operation of the primary node(s) utilized to identify the time information and the spatial information can be utilized to send (or "transmit") one or more jobs for rendering of the respective set(s) of the computer-altered reality data. For instance, with examples in which a job is transmitted, the job can be transmitted to a coordinated node based on time information associated with an experience associated with a user device 102. In those or other examples, the job can be sent based on frame information associated with an experience associated with a user device 102.

In the hypothetical example, alternatively or additionally to the job(s) being sent based on the time information and/or the spatial information, individual ones of the job(s) can be sent along with information identifying an "entire world" (e.g., any data that is associated with the experience, such as all of the computer-altered reality data (e.g., item related data), any other data that is to be utilized for the rendering, etc.) associated with the experience. In various examples, the job(s) can be sent along with information identifying an "entire world" based on the time information and the spatial information (e.g., one or more coordinates associated with the user device 102, the coordinate(s) including an x-coordinate, a y-coordinate, and a z-coordinate associated with a time "time-0" at a beginning of the experience, the x-, y-, and z-coordinates including an "x-0 coordinate," a "y-0 coordinate," and a "z-0 coordinate" corresponding to an initial location associated with the user device 102, the coordinate(s) being utilized to identify a "real world location" of the user device 102, the initial location identifying where at least one of any of the coordinate(s) starts rendering).

In the hypothetical example, the operation of the primary node(s), which can include coordinating the rendering of the computer-altered reality data, can include the primary node(s) assigning the rendering to the coordinated node(s). For instance, with examples in which a primary node assigns the rendering, the primary node can assign one or more nodes to performing rendering of the computer-altered reality data. The node(s) assigned to performing the rendering, which can be identified as rendering node(s), can be assigned as the coordinated node(s).

In the hypothetical example, the operation of the primary node(s) can include the coordinate node(s) (e.g., individual ones, or all, of the coordinate node(s)) being assigned as being one or more nodes associated with the experience (e.g., a same experience). For instance, with examples in which the operation of the primary node(s) includes a primary node transmitting the computer-altered reality data to at least one of the coordinated node(s), the primary node can transmit, the coordinated node(s), information (e.g., any information associated with the experience) (or "world view information") providing a complete spatial world view.

In the hypothetical example, the world view information, which can be included in the coordinated information, can include any or all information providing the complete spatial world view. In some examples, the world view information can include information (or "item location information") associated with the set(s) of the computer-altered reality data. In some examples, the item location information, for example, can include information associated with individual "real world" locations of individual ones of the item(s) represented via the set(s) of the computer-altered reality data). In those or other examples, the item location information can include item synchronization information (or "synchronization information") (e.g., information utilized to provide synchronization among the item(s) represented in the world view information), time and/or frame information, (e.g., the time and/or the frame associated with the experience), or any combination thereof.

In the hypothetical example, the synchronization information can include time synchronization information, frame synchronization information, and/or one or more of any other types of synchronization information. For example, one or more portions (or "synchronization information portion(s)") of the synchronization information, such as the time synchronization information and/or the frame synchronization information can be utilized to provide a "world view" (also referred to herein as "total picture") associated with an experience associated with a user device 102.

The primary mode can maintain, as part of the coordination information, an "understanding" of the "total picture," including any of the computer-altered reality data being rendered by any of the coordinated node(s). The primary can identify (e.g., identify, determine, generate, modify, etc.) one or more coordinated node identifier(s) associated with the coordinated node(s) assigned to render the set(s) of the computer-altered reality data (e.g., along with lighting information indicating one or more lighting conditions associated with the set(s) of the computer-altered reality data, and so on. The primary node can send any information (e.g., the GI information, the pose information, one or more other types of information in the coordination information) associated with the "total picture" to any or all of the coordinate node(s).

In the hypothetical example, for instance, with cases in which some or all of the functionality associated with operation of the primary node(s) as discussed above is included in the initial operation, the initial operation of the primary node(s) can be utilized to start (or "begin") one or more applications (e.g., games) associated with the user device(s) 102. In some examples, execution of the application(s) associated with the user device(s) 102 can be based on completion of a portion (e.g., an entire initial portion) of the initial operation based on primary node information (e.g., initial primary node information), which can include initial information (e.g., selection information (or "initial selection information"), distribution information (or "initial distribution information", coherence information (or "initial coherence information"), aggregation information (or "initial aggregation information"), network information (or "initial network information"), orchestration information (or "initial orchestration information"), one or more types of other initial information, or any combination thereof) included in some or all of the initial primary node information.

In the hypothetical example, an application associated with a user device 102 can begin based on, and/or subsequent to, distribution of at least one of the job(s) (e.g., rendering job(s)). Based on the application beginning, a clock (e.g., a clock being managed, maintained, and/or monitored by the primary node, the coordinated node(s), the user device(s) 102, or any combination thereof) can start to run, and rendering can begin at a start of the clock (e.g., at a "time 0"). The primary node can, constantly and continually, perform synchronization (or "ongoing synchronization") of the coherence information (e.g., time synchronization, spatial synchronization, and/or synchronization of one or more of any other portions of the coherence information). One or more synchronizations as part of the ongoing synchronization can be performed in a similar way as the initial synchronization, as discussed above.

In the hypothetical example, the rendering of the computer-altered reality data can be performed based on information (or "user device scenario information") (or "scenario information") associated with one or more "real world" scenarios (or "scenario(s)") (e.g., one or more scenario characteristics) associated with the user device(s) 102. The scenario information can include pose information (e.g., information including one or more poses associated with the user(s) (e.g., the user(s), the user device(s) 102, or any combination thereof), location information (e.g., information include one or more locations (or "user device location(s)") associated with the user device(s) 102), lighting information (e.g., information include one or more lightings (e.g., one or more lighting directions, one or more lighting intensities, one or more lighting orientations, etc.) associated with the user device(s) 102), and so on, or any combination thereof), and/or one or more of various other types of other scenario information.

In the hypothetical example, the user device scenario information can be provided by (e.g., transmitted, relayed, etc.) by the user device(s) 102. The user device(s) 102 can transmit the pose(s), one or more motion locations (e.g., one or more "real world" locations identifying motion of the user device(s) 102), one or more locations (e.g., one or more "real world" locations at which the user device(s) 102 are located), and/or the lighting information (e.g., the lighting type(s), the lighting direction(s), the lighting intensity (ies), the lighting orientation(s), and/or any lighting information). In some examples, any of various types of locations (e.g., the user device location(s), the motion location(s), etc.) can be included in positional tracking information provided by any of the user device(s) 102.

The scenario information can be identified based on the scenario characteristic(s) (e.g., a characteristic including a direction at which the user is facing). The scenario information, which can be included in the coordination information (e.g., the scenario information can be included in the rendering information), can be sent to individual ones of the coordinated node(s). The coordinated node(s) can utilize the scenario information to identify how to render the computer-altered reality data (e.g., one or more sets of the computer-altered reality data being sent to any of the coordinated node(s) for rendering).

Any of the coordinated node(s) can receive one or more types of relevant information (e.g., the rendering information, one or more of any other types of relevant information utilized for the rendering, or any combination thereof) included in the coordinated information. The coordinated node(s) can utilize the rendering information to identify any of one or more portions of the rendering information associated with any other coordinate node(s). The rendering information can be utilized by the coordinated node(s) to maintain an "awareness" of one another (e.g., an "awareness" of, and/or any information related to, the item(s) being rendered by any of the coordinated node(s)).

In the hypothetical example, any of the coordinated node(s) can identify item information (e.g., object information) associated with the item(s) (e.g., the object(s)) being rendered by any other of the coordinated node(s). The item information can include item location information (e.g., one or more locations of the item(s)), item orientation information (e.g., one or more orientations of the item(s)) (e.g., information identifying whether individual ones of the item(s) are "facing" at least one other of the item(s), and/or vice versa), interactivity information (e.g., one or more user interactions associated with the item(s)), motion information (e.g., one or more motions associated with the item(s)), size information (e.g., one or more sizes associated with the item(s)), item distance information (e.g., one or more distances associated with the item(s), such as distance(s) from the item(s) to the user device(s) 102, and/or distances between any of the item(s) to any others of the item(s)), and/or one or more of other types of item information.

Any of the coordinated node(s) can utilize the rendering information (e.g., the item information) to maintain "awareness" of the item(s), and/or rendering of the item(s), associated with any other coordinated node(s). Rendering (e.g., rendering activity, rendering interactivity, etc.) between the coordinated node(s) can be performed based on the rendering information in the coordinated note(s). For example, the rendering information can include logic in the coordinated node(s) for rendering based on the "awareness" of the rendering of any of the coordinated node(s).

For instance, with cases in which a coordinated node is rendering an item (e.g., a first item (or "item #1," being associated with the computer-altered reality data (e.g., XR item #1 data)/rendering information 128, as discussed below in further detail)), the coordinated node can identify item information associated with the first item, any item information associated with any other item (e.g., a second item (or "item #2," being associated with the computer-altered reality data (e.g., XR item #2 data)/rendering information 130, as discussed below in further detail)) being rendered by any other coordinated node, and/or any information associated with the item and the other item (e.g., how the items are interacting, if at all, whether the items are facing each other, how the items are oriented with respect to one another, how motions of the items are occurring with respect to each one another, how motion of individual ones of the items is occurrence, any other information related to relationships of any type between the items, or any combination thereof).

In the hypothetical example, the coordinated node(s) can render the set(s) of the computer-altered reality data based on one or more frequencies (e.g., one or more requested frequencies, which can be received by the coordinated node(s) and from the primary node). Individual ones of the frequency(ies) can be, but are not always, equivalent to any respective frame rates of the frame rate(s), as discussed above. For example, an individual coordinated node can perform rendering of data (e.g., any of the computer-altered reality data) based on a frequency requested by the primary node. The coordinated node can transmit, to the primary node and without using any type of video compression protocol (e.g., without using any compression such as via h.264), rendered computer-altered reality data (e.g., an output of the rendering of the computer-altered reality data).

Although the term "frequency" can be utilized, for simplicity and easy of explanation, to refer to the frequency at which rendering is performed, as discussed above in the current disclosure, it is not limited as such. In some examples, the term "frequency" can be utilized to refer to a "frame rate" at which the rendered data, which may be received by the primary node and blended, as blended data, is transmitted (e.g., the "frame rate" may refer to a "frequency" for blending of the rendered data, which may be generated, via the blending, as blended data, the blended data being transmitted via h.264 compression) to a user device 102. In various examples, the term "frequency" may refer to a "frame rate" of data (e.g., blended data) being transmitted notwithstanding the blended data being transmitted without any compression at all (e.g., the blended data can be transmitted with each frame being an I (or "key") frame.

For instance, in some cases in which a frequency is received (e.g., the frequency being received, for example, via a communication identifying the frequency, as the requested frequency) from the primary node and by a coordinated node, the coordinated node can identify a set of the computer-altered reality data, with which an item can be associated. The primary node can, for example, identify (e.g., identify, determine, select, modify, etc.) any of the computer-altered reality data to be rendered by the coordinated node. The primary node can, for example, identify (e.g., identify, determine, select, modify, etc.) a frequency to be utilized to render, by the coordinated node, individual ones of the computer-altered reality data. The primary node can transmit the frequency (e.g., a communication indicating, a frequency identifier, a communication identifying the frequency via any other type of information, etc., or a combination thereof) to the coordinated node. The communication can include the computer-altered reality data to be rendered, the frequency identifier, any other data to be utilized by the coordinated node for performing the rendering, etc., or any combination thereof.

The coordinated node can identify (e.g., receive) the frequency and/or the set of the computer-altered reality data to be rendered. The coordinated node can perform the rendering of the set of the computer-altered reality data based on the frequency. The frequency may be equivalent to, or different from, a frame rate for which the set of the computer-altered reality data is to be transmitted.

In various implementations, any rendering frequency (e.g., any of the frequency(ies) utilized for rendering by the coordinate node(s)) may be equivalent to (or "the same as"), or different from, the frame rate of a corresponding user device 102 (e.g., a frame rate of a user device 102 for which set(s) of the computer-altered reality data are being rendered at the rendering frequency). For cases in which the frequency is different from the frame rate, the user device 102 may use one or more functions of various types to present final computer-altered reality data, as discussed below, smoothly, effectively, efficiently, etc., for viewing by the user of the user device 102.

Although the frequency(ies) can be utilized to render the computer-altered reality data as discussed above in the current disclosure, it is not limited as such. In various examples, any of the set(s) of the computer-altered reality data can be rendered by at least one of the coordinate node(s) at one or more of the same frequencies as, or one or more different frequencies from, any frequencies utilized by the coordinate node(s), or any other coordinate node(s), to render any others of the set(s) of the computer-altered reality data.

For instance, with a case in which a set of the computer-altered reality data, with which an item is associated, is being rendered by a coordinated node at a frequency, another set of the computer-altered reality data, with which another item is associated, is being rendered by a coordinated node at a same or a different frequency. The frequency can be the same or different from the other frequency based on one or more computer-altered reality data characteristics (e.g., one or more computer-altered reality data set characteristics) (e.g., one or more item characteristics) associated with the item being the same as, or different from, one or more other item characteristics of the other item.

In various examples, the rendering based on the frequencies for any of the set(s) of the computer-altered reality data can be performed in a similar way as the rendering being performed for any of the set(s) of the computer-altered reality data, based on the frame rates, as discussed above. For example, the rendering can be performed for set(s) of the computer-altered reality data, with which the highest priority items are associated, based on the relevant frequency identified for the rendering. In such an example or another example, the rendering for other set(s) of the computer-altered reality data, with which other "less than highest" priority items are associated, can be performed at one or more relevant frequencies. In some examples, rendering for both of the set(s) of the computer-altered reality data, with which the highest priority items are associated, and the set(s) of the computer-altered reality data, with which other "less than highest" priority items are associated, may occur at times associated with the rendering of the other set(s) of the computer-altered reality data, with which other "less than highest" priority items are associated.

By rendering the other set(s) of the computer-altered reality data, with which other "less than highest" priority items are associated, at one or more different frequencies (e.g., one or more relatively lower frequencies), compute resources and network resources may be conserved. The coordinated node(s) may conserve compute and network resources by not rendering the other set(s) of the computer-altered reality data, with which other "less than highest" priority items are associated, more frequently than is necessary to provide a "natural" viewing experience for the user of a user device 102, with which the other set(s) of the computer-altered reality data are associated.

In various examples, if the blending is performed at the user device 102, based on low priority items being rendered less frequently, a total amount of computer-rendered reality data transmitted over the air may be relatively smaller. Based on the total amount of the computer-rendered reality data transmitted over the air being relatively smaller, an amount of OTA bandwidth may be conserved. Bandwidth being conserved may be allocated for other purposes, such as transmitting, by the coordinated node(s) and to the primary node, one or more rendered sets of the computer-altered reality data, with which higher priority items are associated (e.g., bandwidth being conserved may be allocated for transmitting one or more rendered sets of the computer-altered reality data, with which the highest priority items are associated).

The rendering frequency(ies) can be identified (e.g., identified, determined, generated, modified, etc.) by the primary node based on the rendering information. In some examples, the rendering information utilized to identify the rendering frequency(ies) can include one or more rendering characteristics, one or more characteristics (or "user device characteristic(s)") associated with the user device(s) 102, the computer-altered reality data characteristic(s) (e.g., the item characteristic(s)), one or more application characteristics (e.g., one or more computer-altered reality characteristics associated with one or more applications being executed by the user device(s) 102) (e.g., one or more computer-altered reality application characteristics, one or more computer-altered reality game characteristics, etc.), or one or more of any other types of rendering information, or any combination thereof.

The computer-altered reality data characteristic(s) being rendered can include the set(s) of the computer-altered reality data with which the item(s) are associated. At least one of the set(s) of the computer-altered reality data can be rendered at a same level of graphic detail, or at a different level of graphical detail, with respect to at least one other of the set(s) of the computer-altered reality data.

For instance, with examples in which a set (or "first set") of the computer-altered reality data, with which an item (or "first item") is being rendered, the first set can be rendered at a lower level of graphical detail, with respect to another set (or "second set") of the computer-altered reality data, with which an item (or "second item"). The first set of the computer-altered reality data may be rendered at the relatively lower level of graphical detail based on the computer-altered reality application characteristic(s) indicating the lower level of graphical detail as being associated with the first set of the computer-altered reality data.

The level of graphical details for rendering associated with the first set of the computer-altered reality data may be relatively lower than the level of graphical details for rendering associated with the second set of the computer-altered reality data based on one or more item characteristics of the first item and one or more item characteristics of the second item. The item characteristic(s), in some examples, may be identified by the computer-altered reality application. The item characteristic(s) associated with any of the item(s) may include one or more resolution levels (e.g., one or more levels associated with one or more levels of detail, one or more sizes, one or more nearness levels (e.g., how close an item is from a corresponding user device 102, any of the nearness level(s), for example, being inversely related to a distance between the item and the user device 102) from a corresponding user device 102, one or more of any other item characteristics, or any combination thereof).

In various examples, any modification associated with a level of detail (e.g., a level of resolution) associated with an item, such as a modification of a computer-altered reality data set associated with an item, may be ideal when an item becomes farther away from a view point (e.g., a "real world" location associated with a user device 102) (e.g., based on an item being moved further from the user device 102). Modification being ideal may be, for example, due to any excessive detailed rendering (e.g., rendering using high resolution texture) being "wasteful" and even potentially creating "artifacts" based on the item being too "small" (e.g., based on the item appearing smaller due to a distance between the item and the view point being increased). For example, the item may become "too small" for application of a texture (e.g., a texture map). Reducing the resolution of a texture associated with the item to match the item "size" (e.g., reducing the resolution of the texture associated with the item based on a number of pixels associated with presentation by the user device 102 of the item) may enable more efficient rendering of the computer-altered reality data set associated with the item and may avoid fewer creations of "artifacts."

At least one of the item characteristic(s) may require the same, or different, compute resources for rendering. For instance, with cases in which rendering associated with the first item and the second item is being performed, one or more levels of graphics processing unit (GPU) resources may be larger for rendering associated with the first item than rendering associated with the second item. For example, the level(s) of the GPU resource(s) may be larger for rendering associated with the first item than rendering associated with the second item based on one or more levels of the item characteristic(s) (e.g., a level of detail, a size, a nearness level, any other item characteristic, or any combination thereof) associated with the first item being greater than or equal to one or more levels of the item characteristic(s) (e.g., a level of detail, a size, a nearness level, any other item characteristic, or any combination thereof) associated with the second item.

Rendering of the set(s) of the computer-altered reality data can be performed based on the rendering characteristic(s), which can include one or more "eye boxes." For example, an "eye box" can represent one or more amounts of space (e.g., one or more amounts of an area) (e.g., one or more amounts of data) being rendered for the set(s) of the computer-altered reality data.

In such an example or another example, the "eye box" can be identified (e.g., identified, determined, generated, modified, etc.) by the primary node based on how much data is to be rendered for a set of the computer-altered reality data, with which any of the item(s) is associated. Individual ones of the set(s) of the computer-altered reality data, with which the item(s) are associated may be rendered for a "universe" (e.g., the experience) in such a way as to enable, via "time warping," as discussed above, a user of a user device 102 to view individual ones of the item(s) from one or more different perspectives.

The "eye box" can enable the data being rendered to be utilized by the user device(s) 102 for subsequent presentation. By utilizing "time warping" to render "larger views" of a scene, and/or to perform occluding (e.g., utilizing rendered data based on the "eye box" to reposition any of the item(s) within the "real world" view), rendering of any of the portion(s) of the computer-altered reality data (e.g., any of the set(s) of the computer-altered reality data) may be performed less frequently than would be otherwise requiring, while still maintaining quality levels associated with the experience being viewed by the user. In various implementations, a scene, which may include a "snapshot" of the experience, may include any portion (or "experience portion") of the experience (e.g., a spatial portion, a temporal portion, etc., or any combination thereof) associated with "real world" boundaries (e.g., a spatial portion enclosed by, outlined by, next to, generally encompassed within, and/or otherwise associated with, one or more 3D coordinates) and/or one or more times (e.g., after, before, between, etc., one or more specific points In some examples, the "time warping" can include one or more rotations (e.g., one or more x-axis rotations, one or more y-axis rotations, one or more z-axis rotations, or any combination thereof). By using the "time warping," if an item is moving very fast then a perspective (e.g., a user perspective) of the item relative to a current view will be change. The "time warping" may be utilized to present the item in a different perspective notwithstanding a difference in time between a previous rendering time (e.g., a previous time at which the item was rendered) and a current time being less than an amount of time required to render the item at the current position. The "eye box" may be utilized for the "time warping" by performing the rotation.

Although the "time warping" may be utilized for the blending, based on the blended computer-altered reality data as discussed above in the current disclosure, it is not limited as such. In some examples one or more types of "warping" can be performed as part of the blending. In those or other examples, the "warping" can include the "time warping," "spatial warping," and one or more others of the type(s) of "warping." In those or other examples, the "spatial warping" can include utilizing one or more different "camera views" to generate one or more different perspectives. The "camera view(s)" associated with the perspective(s) may be generated for individual ones of the item(s).

In various examples, the type(s) of "warping" (e.g., the "spatial warping", such as an asynchronous spatial warp (ASW) operation (or "asynchronous spatial warp")) can be utilized, alternatively or additionally to, the "time warping," for purposes of implementing any of the techniques as discussed here. At least one of any of the type(s) of "warping" can be performed separately, or together as an integrated "warping" operation. In some examples, the "spatial warping," which can be utilized in a similar way as discussed above for the "time warping," can be performed to move individual ones of at least one of the item(s) from a depth (e.g., a depth indicated by a depth identifier) to at least one different depth (e.g., a different depth indicated by a different depth identifier), respectively. In those or other examples, the "spatial warping," can be utilized to move at least one of the item(s) forward or backward with respect to a camera (e.g., a user "real world" position).

In some examples, for the ATW, relative sizes of the "eye box" may correspond to the frequency(ies) of the update(s) (e.g., the rendering frequency(ies). In those or other examples, for the ATW, a relatively smaller "eye box" may be utilized for a frequency that is relatively lower. In those or other examples, a relatively larger "eye box" may be utilized for a frequency that is relatively higher.

In some examples, for the ASW, a number of "camera views" utilized may correspond to a distance between a user device 102 and an item. In those examples, a relatively higher number of "camera views" may be utilized for an item relatively nearer to the user device 102 (e.g., the camera). In those examples, a relatively lower number of "camera views" may be utilized for an item relatively farther from the user device 102 (e.g., the camera).

Although the "warping," including the ATW and/or the ASW, may be performed as discussed above in the current disclosure, it is not limited as such. In some examples, the ATW and/or the ASW may be performed based on the "eye box," and/or the number(s) of the "camera views," and/or further based on the item classification(s), as discussed below in further detail. For example, the ATW and/or the ASW may be utilized for cases in which rendering is not performed at a current time that is less than an identified time associated with a rendering interval (e.g., an interval from a previous time utilized for rendering) to be utilized for performing rendering (e.g., the ATW and/or the ASW asso- ciated with item(s) having relatively lower priority(ies) may be utilized relatively more frequently for the blending opera- tion(s) than for item(s) having relatively higher priority(ies)).

Although the "time warping" may be utilized as part of the blending as discussed above in the current disclosure, it is not limited as such. In some examples one or more types of "warping" can be performed as part of the refining.

By utilizing the "eye box" and/or a "time warp," require- ments to perform rendering as frequently, and/or delays and/or interruptions in presenting the computer-altered real- ity data by the user device(s) 102, may be avoided. Even if the user "moves their eyes away" or looks in a different direction, the previously rendered data based on the "eye box" can be utilized to present a different "view" associated with a current portion of the experience at which the user is looking, notwithstanding the portion being different from a previous portion that was utilized to generate the rendered data.

Rendering the set(s) of the computer-altered reality data based on the "eye box" can be performed in such a way as to enable, without performing updated rendering, the user to subsequently view an item from one or more different perspectives, based on changes in the "view" of the user and/or in motion of the item (e.g., the motion of the item, such as motion based on the "physics" of the item, which may result in one or more velocity changes, for example). For example, the set(s) of the computer-altered reality data can be rendered in such a way as to enable the user to view the item from the different perspective(s) based on the item being moved (e.g., based on one or more of any portions (e.g., a partial or entire portion) of the item moving away from the user relative to an initial position, based on one or more of any portions (e.g., a partial or entire portion) of the item moving to a side, based on one or more sizes of one or more of any portions (e.g., a partial or entire portion) of the item, based on one or more portions (e.g., a partial or entire portion) of the item moving at one or more different speeds, based on one or more of any other changes associated with one or more of any portions (e.g., a partial or entire portion) of the item, or any combination thereof).

By rendering the set(s) of the computer-altered reality data in such a way as to enable the user to view an item from one or more different perspectives, the rendering can enable the user to view the item(s) based on one or more of one or more types of changes associated with the "view" of the user and/or with the item(s). The rendering can enable to user to view the object at a different angle, distance, position, orientation, location, etc., or any combination thereof.

The rendering can enable the user to view the item from the different perspective(s) notwithstanding an amount of time required to present the item(s) to the user based on the change(s) being less than would be required to render the set(s) of the computer-altered reality data based on the change(s). For instance, with cases in which an object changes positions and/or orientations quickly, the user can view the item based on the rendering, even though there may not be enough time to render (e.g., render again) a set of the computer-altered reality data, with which the item is asso- ciated, after the change(s) occur and before the item is presented to the user.

The rendering can enable the user to view the item from the different perspective(s) based on the primary node utilizing rendering information (e.g., previous rendering information) associated with a rendered set of the computer- altered reality data at a previous time. The previous render- ing information, which may be associated with the item having a previous orientation, for example, can be utilized to present the item at a current orientation (e.g., an orientation that is different from the orientation associated with the item at a time (e.g., a previous time) at which the item was rendered (e.g., previously rendered)).

The rendering can enable the user to view the item utilizing updated lighting (e.g., an updated, and/or current, lighting condition, an updated shading condition, etc., or any combination thereof). The rendering can enable the user to view the item without the primary node being required to provide updated rendering information to the user device 102. The primary node not needing to update the rendering information can be based on the "eye box." In some examples, the "eye box" can also be utilized to fill in information based on a frame (or "missing frame") of rendering information missing (e.g., based on a frame miss- ing).

In various implementations, the "eye box" utilized to identify an amount of data (e.g., an amount of data associ- ated with an area at one or more sides, above and/or below, behind and/or in front, at one or more different angles, etc.) being rendered, as part of the rendering of the computer- altered reality data (e.g., a set of the computer-altered reality data, with which an item is associated). The "eye box" can be identified (e.g., identified, determined, generated, modi- fied, etc.) by the primary node, and included as part of, separate from, and/or within, the rendering information being transmitted to the coordinated node(s) (e.g., a coor- dinated node utilized to render the set of the computer- altered reality data).

For instance, with cases in which a frame of rendered computer-altered reality data is not received by a user device 102 and from the primary node for some reason (e.g., exhausted resources of the primary node, congested network resources, limited bandwidth, etc.), the item can be pre- sented based on the previous rendering information using the "time warping." The previous rendering information can include rendered computer-altered reality data associated with a "view" for the user and one or more other "views" not being associated with a relationship (e.g., a viewing rela- tionship) between the user and the item. The other "view(s)," for example, may be associated with a direction at which a user is currently viewing the item, which may be different (e.g., at a view with one or more of a different angle, a different orientation, or any of one or more different aspects) from a previous direction at the previous time.

The "eye box," being identified by the primary node, can be utilized by the coordinated node(s) for rendering at least one of the portion(s) of the computer-altered reality data (e.g., at least one portion, which may include at least one of the set(s) of computer-altered reality data, with which at least one of the item(s) are associated), with which one or more portions (or "scene portion(s)") of a scene of the experience are associated. Rendering associated with the scene portion(s) may be performed by rendering a "larger view" that might include at least one portion of the scene not currently being viewable by the user associated with the scene).

Although the rendering of data (e.g., the computer-altered reality data) can be performed in various ways (e.g., rendering being performed utilizing the "eye box," various type of "warping," etc.), and processing of the rendered data can be performed utilizing blending of the rendered data, as discussed above in the current disclosure, it is not limited as such. For instance, with examples in which the refining of blended data (e.g., the blended computer-altered reality data) is performed at a user device 102, based on rendering and/or blending of the data (e.g., based on rendering and/or blending of the computer-altered reality data), a frame rate utilized by a blender (e.g., software code, a software application, a software program, etc., or any combination thereof) of the user device 102 may be equivalent (e.g., may be the same) as a frequency of a rendered computer-altered reality data set of the highest priority.

In some examples, the frequency associated with the rendering of the computer-altered reality data set of the highest priority (e.g., the computer-altered reality data set of associated with the item to be rendered at a highest priority) may be utilized to set the frame rate utilized by the blender (e.g., the frequency associated with the rendering of the computer-altered reality data set of the highest priority may be utilized to set the frame rate utilized by the user device 102 for performing the refining). In those examples, whenever the user device 102 receives the highest priority rendered computer-altered reality data set (e.g., the rendered computer-altered reality data set associated with the item to be rendered with the highest priority), the user device 102 may blend the highest priority rendered computer-altered reality data set with all previously received lower priority rendered computer-altered reality data sets (e.g., one or more rendered computer-altered reality data sets associated with one or more item to be rendered with relatively lower priorities). The blending of the highest priority rendered computer-altered reality data set with the previously received lower priority rendered computer-altered reality data sets may be performed with "time-warping" (e.g., a proper "time-warp" using the "eye boxes scheme) (e.g., all the rendered item sets may be rendered to have an eye box being larger than a "display" associated with the user device 102, in order to for the "time-warp" to be performed).

In various examples, a "rendering pipeline" includes various operations utilized to process the rendered computer-altered reality data. Processing via the rendering pipeline can include generating, as a frame buffer, a frame of the rendered computer-altered reality data. The frame can be accessed using a streaming protocol, and/or be accessed by software utilized to manage and/or perform compression (e.g., H.264 compression, H.265 compression, and/or one or more of any other types of compression) of the frame.

In some examples, one or more compression operations (e.g., a frame by frame compression, and/or one or more of any other types of compression (e.g., image compression), such as discrete cosine transformation (DCT), etc.) can be utilized to compress the frame, as a compressed frame. One or more compressed frames can be generated by, and/or transmitted to, the user device(s) 102. In some examples, the compressed frame(s) can be, additionally or alternatively, generated via encoding operations.

For example, a compressed frame can be generated by, and/or transmitted to, a user device 102. In some cases, as time passes, any of the updated set(s) of the computer-altered reality data can be utilized to modify current corresponding set(s) of the computer-altered reality data. In those examples, any of the set(s) of the computer-altered reality data (e.g., non-updated set(s) of the computer-altered reality data) that did not get updated can be included in, and/or added to, the compressed frame (e.g., via any of the compression and/or the encoding operation(s)).

Although the primary node information can include the selection information, the distribution information, the coherence information, the aggregation information, the network information, and the orchestration information, as discussed above in the current application, it is not limited as such. In some examples, the primary node information can, optionally, include asynchronous time warp (ATW) and occlusion handling.

Although the term "coordination" is utilized with respect to coordination for various types of functionality of the primary node as discussed above in the current disclosure, it is not limited as such. In some examples, the term "coordination," as it is used with respect to any techniques of functionality, can be interpreted as encompassing any of the various types of functionality (e.g., functionality related to rendering, blending, one or more of any other types of aspects, or any combination thereof) for purposes of implementing any of the techniques as discussed throughout this disclosure.

In various implementations, user device information/computer-altered reality data (e.g., XR data) 122 can be identified (e.g., identified, determined, generated, modified, etc.) by the user device(s) 102. The user device information/computer-altered reality data 122 can include blending/synchronization information, ATW/ASW information (e.g., any information utilized to perform the ATW and/or the ASW), scenario information, and/or one or more of any other types of other user device information. The computer-altered reality data (e.g., the XR data) in the user device information/computer-altered reality data 122 can include any of the various types of computer-altered reality data utilized by the user device(s) 102, as discussed above.

The various types of computer-altered reality data utilized by the user device(s) 102 can be included in computer-altered reality data (e.g., XR data)/rendering information (or "group computer-altered reality data (e.g., group XR data)/rendering information") 124, exchanged between the primary node and the user device(s) 102. The group computer-altered reality data (e.g., group XR data)/rendering information 124 can include unrendered computer-altered reality data being transmitted to the primary node, and/or rendered computer-altered reality data being received from the primary node. The group computer-altered reality data (e.g., group XR data)/rendering information 124 can include any rendering information to be utilized to render the computer-altered reality data being transmitted to the primary node in the group computer-altered reality data (e.g., group XR data)/rendering information 124.

In some examples, the group computer-altered reality data in the group computer-altered reality data (e.g., group XR data)/rendering information (e.g., group computer-altered reality data (e.g., group XR data)/rendering information signals (or "group computer-altered reality data (e.g., group XR data)/rendering information communications")) 124 can include any of the various types of computer-altered reality data being received/transmitted, and/or utilized by the user device(s) 102. In those or other examples, the group computer-altered reality data (e.g., group XR data)/rendering information 124 can include any of the rendered computer-altered reality data being previously transmitted from at least one (e.g., all) of the coordinated node(s) and to the primary node, the rendered computer-altered reality data, being (possibly) blended by the primary node, and being transmitted to the user device(s) 102. In those or other examples, the group computer-altered reality data (e.g., group XR data)/rendering information 124 can include any of the computer-altered reality data (e.g., unrendered computer-altered reality data) being transmitted by the user device(s) 102 and to the primary node, the unrendered computer-altered reality data being transmitted by the primary node and to the coordinated node(s).

In various implementations, the blending/synchronization information can be utilized to blend and/or synchronize the rendered computer-altered reality data, as discussed above. In some examples, the user device information can include, alternatively or additionally to the blending/synchronization information, rendering information. In those or other examples, the rendering information can be separate from, or combined and/or integrated with, the blending/synchronization information.

The blending/synchronization information and/or the rendering information can include any information utilized by the user device(s) 102 to perform the blending, synchronization, and/or the rendering, as discussed above. For instance, with examples in which a user device 102 includes the blending information, the user device 102 can utilize the blending information to blend a received scene (e.g., a frame associated with at least one of the rendered set(s) of the computer-altered reality data, the frame, alternatively or additionally, being associated with at least one of the unrendered set(s) of the computer-altered reality data being reused and/or being processed via local rendering. By way of example, the user device(s) 102 can perform, additionally or alternatively to rendering performed by the primary node and/or rendering performed by the coordinated node(s), local rendering of at least one of the set(s) of the computer-altered reality data (e.g., the unrendered set(s) of the computer-altered reality data).

In various implementations, the user device information can include, alternatively or additionally to the blending/synchronization information and/or the rendering information, occlusion handling information (or "occlusion information"). The occlusion information can be utilized to manage occluding of the version(s) of any of the item(s) (e.g., the previous rendered version(s) of an item), as discussed above.

In various implementations, the pose information can include any information associated with one or more poses, which may be associated with the user device(s) 102, respectively. For instance, with cases in which a user device 102 is utilized to perform blending and/or refining of the rendered computer-altered reality data, the blending and/or the refining can be performed based on the pose information, as discussed above. In some examples, the pose information may be generated based on pose tracking (e.g., pose tracking performed by a pose tracking system, the pose tracking system being software, an application, a program, etc., or a combination thereof, which may be executed via the user device 102 and/or one or more servers). The pose tracking system may detect a precise pose of the user device 102 (e.g., a head-mounted display, a controller, any of one or more other types of objects or body parts within Euclidean space).

Although the term "pose tracking system" may be utilized, for simplicity and convenience, with respect to how the pose tracking may be performed and utilized for the blending and/or the refining, as discussed above in the current disclosure, it is not limited as such. In some examples, the pose tracking system may be, alternatively or additionally, referred to as six degrees of freedom (or "6DOF") tracking (e.g., the 6DOF tracking being utilized for six degrees of freedom in which the pose may often be tracked).

In various implementations, coordinated node information/computer-altered reality data (e.g., XR data) 126 can be identified (e.g., identified, determined, generated, modified, etc.) by the coordinated node(s). In some examples, the coordinated node information/computer-altered reality data (e.g., the XR data) 126 can include the coordinated node information (e.g., distributed network information), which can include validation/allocation information, management information, rendering information, and/or one or more of any other types of other coordinated node information. The computer-altered reality data (e.g., the XR data) in the coordinated node information/computer-altered reality data (e.g., the XR data) 126 can include any of the various types of computer-altered reality data utilized by the coordinated nod(s), as discussed above.

The various types of computer-altered reality data utilized by the coordinated node(s), as discussed above, can be included in, for example, computer-altered reality data (e.g., XR item #1 data)/rendering information 128, computer-altered reality data (e.g., XR item #2 data)/rendering information 130, computer-altered reality data (e.g., XR item #3 data)/rendering information 132, computer-altered reality data (e.g., XR item #4 data)/rendering information 134, computer-altered reality data (e.g., XR item #5 data)/rendering information 136, computer-altered reality data (e.g., XR item #6 data)/rendering information 138, computer-altered reality data (e.g., XR item #7 data)/rendering information 140, and/or one or more of others of the set(s) of computer-altered reality data/rendering information, as discussed above. The computer-altered reality data (e.g., XR item(s) #1-7 data)/rendering information 128-140 can be exchanged between the primary node and individual ones of the coordinated nodes.

The computer-altered reality data (e.g., XR item(s) #1-7 data)/rendering information (e.g., computer-altered reality data (e.g., XR item(s) #1-7 data)/rendering information signals (or "computer-altered reality data (e.g., XR item(s) #1-7 data)/rendering information communications")) 128-140 can include individual ones of the unrendered set(s) of the computer-altered reality data being transmitted to the coordinated node(s), and/or individual ones of the rendered set(s) of the computer-altered reality data being received from the coordinated node(s). The computer-altered reality data (e.g., XR item(s) #1-7 data)/rendering information 128-140 can include any rendering information to be utilized to render the computer-altered reality data being transmitted to individual ones of the coordinated node(s) in the computer-altered reality data (e.g., XR item(s) #1-7 data)/rendering information 128-140.

In some examples, the group computer-altered reality data in the group computer-altered reality data (e.g., group XR data)/rendering information") 124 can include any of the various types of computer-altered reality data being received and utilized by the user device(s) 102. In those or other examples, the group computer-altered reality data (e.g., group XR data)/rendering information 124 can include any of the rendered computer-altered reality data being previously transmitted from at least one (e.g., all) of the coordinated node(s) and to the primary node, the rendered computer-altered reality data, being (possibly) blended by the primary node, and being transmitted to the user device(s) 102.

In various examples, the validation/allocation information can include information utilized to validate and/or allocate the computer-altered reality data (e.g., the XR data) received by the coordinated node(s), the computer-altered reality data (e.g., the XR data) being received to be rendered by the coordinated node(s). For instances, with cases in which at least one of the set(s) of the computer-altered reality data are received, as received computer-altered reality data, by a coordinated node, the coordinated node can validate that there are no errors associated with the received computer-altered reality data. The coordinated node can validate that received computer-altered reality data is complete, and that any other necessary information (e.g., any of the coordinated information) required for rendering the received computer-altered reality data, is also received without any errors.

The coordinated node, utilizing the validation/allocation information, can identify (e.g., validate) that sufficient compute resources are available for rendering the received computer-altered reality data. The coordinated node can allocate the compute resources to be utilized to render the received computer-altered reality data. The coordinated node can render the received computer-altered reality data, utilizing the allocated compute resources.

In those or other examples, the coordinate node, based on not satisfactorily identifying the compute resources sufficient for the rendering, can transmit one or more messages to the primary node and/or at least one of the other coordinated node(s). In some examples, the message(s) can be utilized by the primary node to reassign rendering of the computer-altered reality data to at least one other coordinated node. In those or other examples, the at least one of the other coordinated node(s) can respond, based on identifying sufficient compute resources for rendering at least sone of the computer-altered reality data, with a message to the coordinated node to request the computer-altered reality data in order to receive and render the computer-altered reality data. In those or other examples, the at least one of the other coordinated node(s) can transmit a request to the primary node to request the primary node to reassign rendering of the computer-altered reality data to at least one other coordinated node from which the message is transmitted.

In various implementations, the primary node can maintain data ("compute resource level data"), for example, in a database or any other type of data structure, including one or more levels of compute resources (e.g., levels of compute resources being utilized and/or expended) associated with the coordinated node(s). The primary node can analyze the compute resource level data and identify whether any level of compute resources associated with any of individual ones of the coordinated node(s) is less than a compute resource level threshold.

The primary node can obtain, request, and/or receive individual ones of one or more levels of compute resources associated with the coordinated node(s). The primary node can compare individual ones of one or more levels of compute resources associated with the coordinated node(s), and reassign rendering of the computer-altered reality data to at least one of the coordinated node(s) having a level of compute resources being greater than or equal to individual ones of at least one level of compute resources associated with at least one other coordinated node, respectively, and/or individual ones of all of the other coordinated node(s), respectively. In some examples, reassignment for individual ones of the coordinated node(s) can be performed by the primary dynamically (e.g., automatically), based on the primary node identifying the level of compute resources associated with individual ones of the coordinated node(s) is less than the compute resource level threshold.

In various implementations, the management information in the coordinated node information/computer-altered reality data (e.g., XR data) 126 can be utilized by the coordinated node(s) to manage resource management. In some examples, performing the resource management can include the coordinated node(s) performing dynamic resource management. In those or other examples, performing the dynamic resource management can include individual ones of the coordinated node(s) analyzing one or more resources (e.g., one or more compute resources, one or more network resources, and/or one or more of any other types of other resources).

The dynamic resource management can include individual ones of the coordinated node(s) identifying whether individual ones of the resources are less than one or more corresponding resource level thresholds. The dynamic resource management can include, based on individual ones of the resources being less than one or more corresponding resource level thresholds, individual ones of the coordinated node(s) and/or the primary node (e.g., the primary node, which can perform, additionally or alternatively to the coordinated node(s), dynamic resource management), requesting, transferring, queuing, individual ones of one or more jobs (e.g., rendering jobs associated with at least one of the set(s) of the computer-altered reality data) for processing by at least one other of the coordinated node(s).

Job(s) for rendering the set(s) of the computer-altered reality data can be dynamically assigned, re-assigned, queued, managed, etc. For example, individual ones of the coordinated node(s) and/or the primary node can identify the job(s) to be transferred and can request, obtain, transfer, retrieve, etc., the job(s) for processing by the at least one other of the coordinated node(s). The at least one other of the coordinated node(s) can process the job(s) being requested, obtained, transferred, retrieved, etc.

In various implementations, the rendering information in the coordinated node information/computer-altered reality data (e.g., XR data) 126 can be utilized by the coordinated node(s), as any of the rendering information discussed above, to perform any of the rendering. For example, the rendering information may be utilized by the coordinate node(s) to render the set(s) and/or the portion(s) of the computer-altered reality data (e.g., the job(s) for the rendering of the computer-altered reality data may be executed based on the rendering information).

In some examples, the at least one server of the server(s) 112 being operated as the primary node can be identified based on location data (or "user device location data") associated with the user device(s) 102 and/or location data (or "server location data") associated with the server(s) 112-118. In those or other examples, the at least one server of the server(s) 112 being operated as the primary node can be identified based on a distance between the at least one server of the server(s) 112 and the user device(s) 102 being less than a threshold distance.

In various examples, at least one of the server(s) 112-118 can be utilized to render the computer-altered reality data (e.g., any of the set(s) of the computer-altered reality data, with which the item(s) #1-#7 in the computer-altered reality data (e.g., XR item(s) #1-7 data)/rendering information 128-140 are associated). The at least one of the server(s) 112-118 can be identified based on priority information. The priority information can be identified based on characteristics data.

In various examples, the characteristics data can include depth information (e.g., one or more depths, which can include one or more distances between individual ones of the item(s) and the user device(s) 102), interactivity information (e.g., one or more user interactions associated with the item(s)), motion information (e.g., one or more motions associated with the item(s)), complexity information (e.g., one or more portions of complexity information being identified, such as by the application logic in the user device(s) 102, based on one or more sizes associated with the item(s), one or more screen resolution capabilities, one or more refreshment rate capabilities, one or more user control input capabilities, etc., or any combination thereof), and/or one or more of other types of characteristics information.

In various implementations, the set(s) of the computer-altered reality data, with which the item(s) having relatively higher levels of the characteristic(s) are associated, can be assigned to have one or more relatively higher priorities than the set(s) of the computer-altered reality data, with which the item(s) having relatively lower levels of the characteristic(s) are associated. For example, the set(s) of the computer-altered reality data, with which the item(s) having one or more relatively higher levels of user interactivity (e.g., the user interaction(s)), motion, and/or complexity are associated, can be assigned to have the relatively higher priority(ies) than the set(s) of the computer-altered reality data, with which the item(s) having relatively lower levels of user interactivity (e.g., the user interaction(s)), motion, and/or complexity are associated.

By identifying the priority information (e.g., the priority (ies)) associated with the set(s) of the computer-altered reality data, one or more sets of the computer-altered reality data being of a relatively higher priority can be rendered more quickly, and/or at respective ones of the server(s) 112-118 being closer to the primary node and/or the user device(s) 102, than respective ones of the server(s) 112-118 being utilized to render one or more sets of the computer-altered reality data being of a relatively lower priority. For example, the server 112(B) being utilized to render the computer-altered reality data in the computer-altered reality data (e.g., XR item #1 data)/rendering information 128 may be nearer to the primary node than the server 114(A), in the network near-edge 106, utilized to render the computer-altered reality data in the computer-altered reality data (e.g., XR item #2 data)/rendering information 130, based on the item #1 having a relatively higher priority than the item #2. In such an example or another example, server 114(A) utilized to render the computer-altered reality data in the computer-altered reality data (e.g., XR item #2 data)/rendering information 130 may be nearer to the primary node than the server 116(A), in the network mid-edge 108, utilized to render the computer-altered reality data in the computer-altered reality data (e.g., XR item #4 data)/rendering information 134, based on the item #2 having a relatively higher priority than the item #4. In such an example or another example, server 116(A) utilized to render the computer-altered reality data in the computer-altered reality data (e.g., XR item #4 data)/rendering information 134 may be nearer to the primary node than the server 118(A), in the network far-edge 110, utilized to render the computer-altered reality data in the computer-altered reality data (e.g., XR item #6 data)/rendering information 138, based on the item #4 having a relatively higher priority than the item #6.

Although individual ones of the set(s) of the computer-altered reality data can be associated with a corresponding individual item, and individual ones the portion(s) of the computer-altered reality data can include one or more of the set(s) of the computer-altered reality data as discussed above in the current disclosure, it is not limited as such. In some example, individual ones of the set(s) of the computer-altered reality data can be associated with any number of the item(s), and/or vice versa. In those or other examples, individual ones of the portion(s) of the computer-altered reality data can be associated with any number of the set(s) (e.g., any number of the item(s)), and/or vice versa.

Although individual ones of set(s) of computer-altered reality data rendering information can be associated with rendering for a corresponding individual item, and individual ones of portion(s) of the computer-altered reality data rendering information can include one or more of the set(s) of the computer-altered reality data rendering information as discussed above in the current disclosure, it is not limited as such. In some example, individual ones of the set(s) of the computer-altered reality data rendering information can be associated with rendering for any number of the item(s), and/or vice versa. In those or other examples, individual ones of the portion(s) of the computer-altered reality data rendering information can be associated with any number of the set(s) (e.g., any number of the item(s)), and/or vice versa.

Although the terms "item" and "object" are utilized for simplicity and ease of discussion throughout the current disclosure, it is not limited as such. In some examples, the term "item" can refer to any of one or more aspects (e.g., one or more items, one or more objects, one or more portions, one or more features, one or more areas, one or more formations, one or more patterns, one or more forms, one or more shapes, and/or any of one or more other types of aspects) being represented by the computer-altered reality data. In those or other examples, the term "object" can refer to any of one or more items represented by the computer-altered reality data, the item to which any occurrence of the term "object" is referring including an item that is self-contained, enclosed, independent, automated, mobile, stationary, and so on, or any combination thereof. For example, the term "object" can refer to a vehicle, a person, an animal, a building, a tree, etc.

In those or other examples, the item to which any occurrences of the term "item" is referring, such as with instances in which the term "item" is not referring to an item that is an object, can include any item (e.g., any non-object) that is expansive, globular, not self-contained, diffused, spread out, discontinuous, and so on, or any combination thereof. For example, the term "item," in reference to any item that is not an "object," can refer to one or more of various types of items, such as weather constructs (e.g., rain, fog, clouds, etc.), environmental constructs (e.g., landscapes, horizons, hills, etc.), atmospheric occurrences (e.g., northern lights, bioluminescent algae, etc.), and so on, or any combination thereof.

However, any techniques in which any occurrences of the terms "item" and/or "object" appear are not limited thereto, and any techniques being discussed with reference to the term "item" and/or the term "object" can be interpreted as being implemented, in some cases, in a similar way using one or more items of any type (e.g., one or more objects, one or more non-objects, or any combination thereof). In some implementations, the term "item" and object" may be interpreted as being interchangeably referring to any representation associated with computer-altered reality data.

Although the term "object" refers to any of the object(s) of various types, for simplicity and ease of explanation, as discussed throughout the current disclosure, it is not limited as such. In some examples, the term "object" can refer to any of one or more objects of one or more types (e.g., vehicles, persons, animals, etc.), such as an object in motion. In those or other examples, the term "object" can refer to any of one or more objects of one or more other types (e.g., buildings, rocks, trees (e.g., stationary trees), etc.), such as an object (e.g., a stationary object) not in motion.

In those or other examples, the term "object" can refer to any of one or more objects of one or more types, such as an object with which the user is interacting highly, or interacting in any other way (e.g., with moderate interactivity). In those or other examples, the term "object" can refer to any of one or more objects of one or more other types, such as an object with which the user is not interacting.

Although the primary node information can be identified as being associated with the primary node as discussed above in the current disclosure, it is not limited as such. For example, the primary node can include an "instance" associated with an experience associated with a user device 102. The instance, which may be generated as the primary node, may be generated based on any number of servers and/or based on any amount of time and/or any number of experiences associated with any number of user device(s) 102. Any of the server(s) associated with the primary node may include any number of the coordinated node(s).

In some examples, the primary node may be generated to "reside" on a server based on a distance between a user device 102 and the server being less than a threshold distance. In some examples, the primary node may be generated to "reside" on the server based on a distance between the user device 102 and the server being less than or equal to individual ones of one or more other distances between the user device 102 and one or more servers to be utilized for the coordinated node(s).

In some examples, any portion (e.g., information) of the primary node information can be generated (e.g., generated by the primary node) and/or received (e.g., received by the primary node and from at least one of the network(s), such as from at least one of the server(s) 112-118 and/or one or more other servers), based on the portion(s) of the primary node information being generated by the at least one of the server(s) 112-118 and/or the other server(s)).

Although the coordinate(s) (e.g., one or more "real world" coordinates) may be associated with individual ones of the location(s) of the user device(s) 102 as discussed in the current disclosure, it is not limited as such. In some examples, one or more coordinates may be based on a user (e.g., a user device 102), as a "reference" (e.g., as one or more reference coordinates). A "coordinates area" associated with (e.g., bound by, identified by, etc.) the coordinate(s) can be utilized as a coordinates "world view." The "world view" (also referred to herein as a "point cloud") may be utilized to identify (e.g., identify, determine, generate, modify, set, etc.) one or more locations associated with one or more of the item(s) (e.g., one or more locations associated with one or more of a desk, a chair, etc.). The user may be able to "move around" (e.g., change one or more poses, such as a pose associated with at least one of an x-coordinate, a y-coordinate, or a z-coordinate) within the experience, based on the rendering being performed for the computer-altered reality data to enable one or more different views of the location.

Although the pose information, which may be included in the rendering information, can include the pose(s) associated with the user(s) (e.g., the user(s), the user device(s) 102, or any combination thereof)) as discussed above in the current disclosure, it is not limited as such. In various examples, any of the pose(s) can be associated with any portion (e.g., body part, etc.) associated with the user. For instance, with cases in which a pose associated with a hand of a user is identified, the pose can include any information associated with the hand. The information associated with the hand can include information associated with one or more locations of one or more portions (e.g., one or more fingers) (or "sub-portion(s)") of the hand, one or more motions of the sub-portion(s), respectively, one or more orientations of the sub-portion(s), respectively, one or more of any other types of information associated with the portion(s) and/or the sub-portion(s), respectively, or any combination thereof.

In some examples, the pose(s) can include a pose associated with a "view" of the user. For example, the pose(s) can indicate "what the user is looking at" (e.g., any number of one or more "real world" portions, one or more types of any other "view aspects," such as any of the computer-altered reality data, including at least one of the item(s), etc., or any combination thereof), a current position (e.g., a "real world" position) of the user, one or more hand gestures of the user, etc., or any combination thereof.

Although various ones of the server(s) 112(B)-118(B) can be utilized to perform various rendering operations as discussed above in the current disclosure, it is not limited as such. In some examples, any of the servers, including the server(s) 112(A), can be utilized to perform rendering.

Although the game logic can be utilized for identifying characteristic data utilized for the rendering coordination, as discussed above in the current disclosure, it is not limited as such. In some example, the game logic can include any type of game logic being utilized (e.g., executed) by a user device 102, a combination of the user device(s) 102, a server, a combination of one or more servers, or any combination thereof. The game logic associated with the user device 102, the combination of the user device(s) 102, the server, the combination of the one or more servers, or any combination thereof, can be utilized in a similar way as any of the game logic as discussed herein, for purposes of implementing any of the techniques of the current disclosure.

In some examples, one or more game logics can be utilized at one or more different locations (e.g., the user device(s) 102, one or more of various servers, etc., or a combination thereof. In those or other examples, at least one of the game logic(s) stored and/or utilized at the server(s) associated with the primary node can be utilized to manage (e.g., coordinate, in any way, as discussed with respect to game logic, as discussed herein) various functions, and/or to manage at least one of any others of the game logic(s) (e.g., at least one of any other game logic (e.g., one or more game logic delegates, possibly with one or more virtual tool icons selectable by a user to be included in an experience for the user, for creating the game logic at the server(s) associate with the primary node, for example) at any other location).

Figure 2:
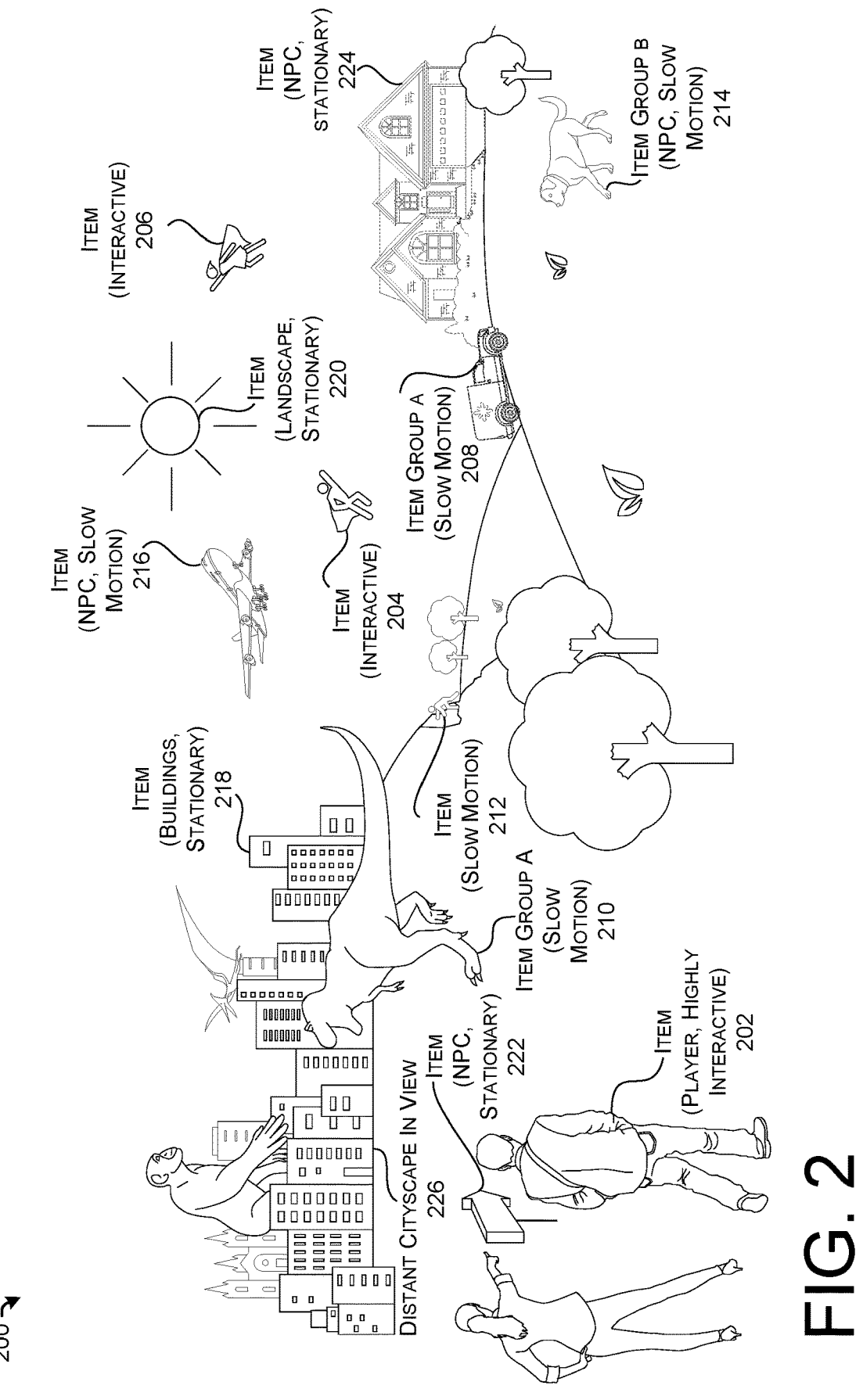
FIG. 2 depicts an example presentation of computer-altered reality data being rendered via computer-altered reality data rendering coordination.

FIG. 2 depicts an example presentation 200 of computer-altered reality data being rendered via location-based computer-altered reality data rendering coordination. The presentation 200 can include one or more items associated with the computer-altered reality data (e.g., the computer-altered reality data in the group computer-altered reality data (e.g., group extended reality (XR) data)/rendering information 124), as discussed above with reference to FIG. 1.

In various examples, the item(s) can include at least one item associated with at least one user, the at least one item including at least one of an item 202, an item 204, or an item 206. In those or other examples, the item 202 can be associated with an object (e.g., a representation of a user (or "player") (or "protagonist")) associated with a user device, such as a user device 102. In those or other examples, individual ones of the item 204 and/or the item 206 can be an object (e.g., a representation of a person (e.g., a user (or a "player") (or a "protagonist"), associated with a user of a user device, such as a user device 102 and/or any other user device, as discussed above with reference to FIG. 1). In those or other examples, individual ones of the item 202, the item 204, and/or the item 206 can have one or more characteristics (or "item characteristic(s)") (e.g., object characteristics), including a user interactivity characteristic (e.g., a highly interactive characteristic).

In some examples, the item 202 can have one or more characteristics (or "item characteristic(s)") (e.g., object characteristics), including a view characteristic (e.g., a "first-person view"), an interactivity characteristic (e.g., an interactivity of "highly "interactive"), a motion characteristic (e.g., a motion of "fast motion"). In those or other examples, individual ones of the item 204, and/or the item 206 can have one or more characteristics, including a view characteristic (e.g., a "third-person view"), an interactivity characteristic (e.g., an interactivity of "interactive"), a motion characteristic (e.g., a motion of "auto-motion," near the viewpoint).

In various examples, the item(s) can include at least one item (e.g., at least one object) in a group (or "Group A"), the at least one item including at least one of an item 208 or an item 210. In those or other examples, the item 208 can be associated with one or more objects (e.g., a vehicle) (e.g., an ambulance), and the item 210 can be associated with one or more objects (e.g., an animal) (e.g., one or more dinosaurs, one or more "king-kong" animals, etc.). In those or other examples, individual ones of the item 208 and/or the item 210 can have one or more characteristics (or "item characteristic(s)"), including an interactivity characteristic (e.g., an interactivity of "interactive") and a motion characteristic (e.g., a motion of "slow" motion, far away from the view point). Individual ones of the item 208 and/or the item 210 can be associated with an object (e.g., a "protagonist").

In various examples, the item(s) can include at least one item (e.g., at least one object), the at least one item including an item 212. In those or other examples, the item 212 can be associated with one or more objects. In those or other examples, the item 212 can have one or more characteristics (or "item characteristic(s)"), including an NPC (e.g., a bot) characteristic and a motion characteristic (e.g., a motion of "auto-motion," near the view point).

In various examples, the item(s) can include at least one item (e.g., at least one object) in a group (or "Group B"), the at least one item including an item 214. In those or other examples, the item 214 can be associated with one or more objects (e.g., an animal) (e.g., a dog). In those or other examples, the item 214 can have one or more characteristics (or "item characteristic(s)"), including an NPC (e.g., a bot) characteristic and/or a motion characteristic (e.g., a motion of "slow" motion, farther away from the view point).

In various examples, the item(s) can include at least one item (e.g., at least one object), the at least one item including an item 216. In those or other examples, the item 216 can be associated with one or more objects (e.g., a vehicle) (e.g., a plane). In those or other examples, the item 216 can have one or more characteristics (or "item characteristic(s)"), including an NPC (e.g., a bot) characteristic and/or a motion characteristic (e.g., a slow motion characteristic).

In various examples, the item(s) can include at least one item, the at least one item including at least one of an item 218 or an item 220. In those or other examples, the item 218 can be associated with one or more buildings, and the item 220 can be associated with one or more landscape portions (e.g., a sun). In those or other examples, individual ones of the item 218 and/or the item 220 can have one or more characteristics (or "item characteristic(s)"), including a building and/or landscape characteristic, and/or a motion characteristic (e.g., a stationary characteristic).

In various examples, the item(s) can include at least one item, the at least one item including at least one of an item 222 or an item 224. In those or other examples, the item 222 can be associated with one or more signs, and the item 224 can be associated with one or more buildings (e.g., a house). In those or other examples, individual ones of the item 222 and/or the item 224 can have one or more characteristics (or "item characteristic(s)"), including an NPC (e.g., a bot) characteristic and/or a motion characteristic (e.g., a stationary characteristic.

In various examples, the item(s) can include at least one item, the at least one item including an item 226. In those or other examples, the item 226 can be associated with one or more distant cityscapes (e.g., a cityscape in a view of a user) (e.g., a cityscape in a "real world" view of an environment of a user). While the object In various implementations, the item(s) of the computer-altered reality data in the presentation 200 can be rendered based on one or more categories (e.g., the item category(ies), as discussed above with reference to FIG. 1). In some examples, the item 202 can be rendered according to the item category(ies), including a first category (or "Category #1"). In those or other examples, at least one of the item 204 or the item 206 can be rendered according to the item category(ies), including a second category (or "Category #2"). In those or other examples, at least one of the item 208 or the item 210 can be rendered according to the item category(ies), including a third category (or "Category #3"). In those or other examples, at least one of the item 212 or the item 214 can be rendered according to the item category(ies), including a fourth category (or "Category #4").

In those or other examples, at least one of the item 216, the item 218, the item 220, the item 222, or the item 224 can be rendered according to the item category(ies), including a fifth category (or "Category #5"). In those or other examples, at least one of the item 226 may not be rendered due to the item 226 being a "real world" item.

In some implementations, the priority(ies) utilized for assigning the item(s) to the location(s) (e.g., the server(s)) can be identified based on the category(ies). Individual ones of the priority(ies) can be assigned as a relatively higher priority based on the category being relatively higher. Individual ones of the priority(ies) can be assigned as a relatively lower priority based on the category being relatively lower. For example, the item 202 can have a highest priority, and at least one of the item 216, the item 218, the item 220, the item 222, or the item 224 can have, respectively, any of various lower priorities (e.g., a lowest priority).

By utilizing the priority(ies) and/or the category(ies), rendering of the item(s) 202-224 can be performed at different network location(s) (e.g., different ones of the server(s) 112-118, as discussed above with respect to FIG. 1, at different respective locations). In some examples, rendering of at least one of the items (e.g., the item 202) can be performed at locations relatively closer to the primary node and/or the user device 102, in comparison to other items (e.g., based on the item 202 having the highest priority). For example, rendering of the item 202 can be performed at the server(s) 112(B). In those or other examples, rendering of at least one of the items (e.g., the items 216-224) can be performed at locations relatively farther away from the primary node and/or the user device 102 (e.g., based on any of the items 216-224 having the lowest priority). For example, rendering of the items 216-224 can be performed at the server(s) 118(A) and/or 118(B)). In those or other examples, rendering of other items (e.g., the items 204-214) can be performed at locations corresponding to priority(ies) of rendering of the item(s), as discussed above with reference to FIG. 1.

FIG. 3 depicts an example process for computer-altered reality data rendering coordination illustrated in FIGS. 1 and 2.

At operation 302, the process can include exchanging, with a user device 102, at least one communication associated with computer-altered reality data. For example, the at least one communication can include a communication from the user device 102 and to a primary node. The communication can include any of the computer-altered reality data (e.g., at least one of the set(s) of computer-altered reality data, with which at least one of the item(s) is associated, respectively) in the group computer-altered reality data (e.g., group XR data)/rendering information") 124. The group computer-altered reality data (e.g., group XR data)/rendering information") 124 can include information, which can be received from the user device 102 and included in the rendering information to be utilized by the coordinated node(s) to render the computer-altered reality data.

At operation 304, the process can include transmitting, to at least one coordinated node, at least one set of the computer-altered reality data, the at least one coordinated node utilizing at least one portion of computer-altered reality data rendering information to render, as at least one set of rendered computer-altered reality data, the at least one data set of computer-altered reality data. The primary node can transmit the at least one of the set(s) of computer-altered reality data, with which at least one of the item(s) is associated, respectively, to at least one of the coordinated node(s).

The at least one of the set(s) of computer-altered reality data can be included, for example, in the computer-altered reality data (e.g., XR item #2 data)/rendering information 130. The set(s) of computer-altered reality data can be transmitted to the server(s) 114(A) instead of any of the server(s) 116 or 118, for example, based on the set(s) of computer-altered reality data having one or more respective priorities that are higher than other priorities of one or more other sets of computer-altered reality data (e.g., the other sets of computer-altered reality data being included the computer-altered reality data (e.g., XR item(s) #4-7 data)/ rendering information 134-140). The other set(s) of computer-altered reality data can be transmitted to any of the server(s) 116 and/or 118, for example. In various examples, at least one interactivity, at least one motion, and/or at least one complexity of the item #2 may be greater than or equal to, for example, at least one motion, and/or at least one complexity, respectively, of at least one of the items #4-7.

At operation 306, the process can include receiving, from the at least one coordinated node, at least one data set of rendered computer-altered reality data. The at least one data set of the rendered computer-altered reality data can be received in the computer-altered reality data (e.g., XR item

2 data)/rendering information 130. The at least one data set of the rendered computer-altered reality data can be received from the server(s) 114(A).

At operation 308, the process can include routing the at least one data set of the rendered computer-altered reality data to the user device. The at least one data set of the rendered computer-altered reality data being received can be routed in the group computer-altered reality data (e.g., group XR data)/rendering information") 124. The at least one data set of the rendered computer-altered reality data can be routed to the user device 102.

In various examples, the at least one data set of the rendered computer-altered reality data can be blended, by the primary node, and routed, as at least one data set of blended computer-altered reality data to the user device 102. Alternatively, the at least one data set of the rendered computer-altered reality data can be routed to the user device 102, and blended, by the user device 102, as at least one data set of blended computer-altered reality data. The user device 102 can present the at least one data set of the blended computer-altered reality data for a user of the user device.

FIG. 4 depicts an example system architecture for a computing device 400. FIG. 4 is a block diagram of an example server computer utilized to implement the computer-altered reality data rendering coordination.

The computing device 400 may be representative of any of one or more devices (e.g., any of the user device(s) 102), any of one or more servers (e.g., any of the server(s) 112-118, as discussed above with reference to FIG. 1), as discussed above with reference to FIG. 1), or any combination thereof.

As shown, the computing device 400 may include one or more processors 402 and one or more forms of computer-readable memory 404. The computing device 400 may also include additional storage devices. Such additional storage may include removable storage 406 and/or non-removable storage 408.

The computing device 400 may further include input devices 410 (e.g., a touch screen, keypad, keyboard, mouse, pointer, microphone, cameras, sensors, controllers, and other positional tracking systems, etc.) and output devices 412 (e.g., a display, printer, speaker, etc.) communicatively coupled to the processor(s) 402 and the computer-readable memory 404. The computing device 400 may further include communications interface(s) 414 that allow the computing device 400 to communicate with other network and/or computing devices 416 (e.g., any of the user device(s) 102) (e.g., any of the server(s) 112-118) such as via a network. The communications interface(s) 414 may facilitate transmitting and receiving wired and/or wireless signals over any suitable communications/data technology, standard, or protocol, as described herein.

In various embodiments, the computer-readable memory 404 comprises non-transitory computer-readable memory 404 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 404 may also be described as computer storage media and may include volatile and nonvolatile, removable and non-removable media implemented in any method or technology for storage of information, such as computer readable instructions, data structures, program modules, or other data. Computer-readable memory 404, removable storage 406 and non-removable storage 408 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 400. Any such computer-readable storage media may be part of the computing device 400.

The memory 404 can include logic 418 (i.e., computer-executable instructions that, when executed, by the processor(s) 402, perform the various acts and/or processes disclosed herein) to implement automated dependency graph builder management, according to various examples as discussed herein. For example, the logic 418 is configured to carry out location-based computer-altered reality data rendering management using user activity data, via any of the user device(s) 102, and/or any of the server(s) 112-118. The memory 404 can further be used to store data 420, which may be used to implement location-based computer-altered reality data rendering management, as discussed herein. In one example, the data 420 may include any type of data (e.g., the computer-altered reality data (e.g., the XR data), the characteristics data, etc.), any type of information (e.g., the rendering location information, the network category information, etc.), and so on, or any combination thereof.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

What is claimed is:

1. A method comprising:

exchanging at least one computer-altered reality data oriented communication with a user device;

based on the at least one computer-altered reality data oriented communication, identifying, by a primary node, computer-altered reality data that includes at least one set of computer-altered reality item data, wherein the primary node is initiated via an edge server associated with a network edge location, the network edge location being identified by an edge location identifier that is based on a device location identifier indicating a location of the user device;

identifying primary node rendering coordination information based on the computer-altered reality data being identified, and at least one portion of computer-altered reality data rendering information based on the at least one set of computer-altered reality item data being identified;

based on the primary node rendering coordination information, transmitting, to at least one coordinated node, the at least one portion of computer-altered reality data rendering information and the at least one set of computer-altered reality item data, the at least one coordinated node utilizing the at least one portion of computer-altered reality data rendering information to render, as at least one set of rendered computer-altered reality item data, the at least one set of computer-altered reality item data;

receiving, from the at least one coordinated node, the at least one set of rendered computer-altered reality item data; and transmitting the at least one set of rendered computer-altered reality item data to the user device, the at least one set of rendered computer-altered reality item data being blended by the primary node or the user device.

2. The method of claim 1, wherein identifying primary node rendering coordination information further comprises:

identifying at least one of selection information, distribution information, coherence information, aggregation information, network information, or orchestration information; and identifying the primary node rendering coordination information, including the at least one of the selection information, the distribution information, the coherence information, the aggregation information, the network information, or the orchestration information.

3. The method of claim 1, further comprising:

transmitting, by an edge server and to a user device, a portion of the primary node rendering coordination information, blending, as first blended computer-altered reality data, the at least one set of rendered computer-altered reality item data based on the portion of the primary node rendering coordination information, wherein transmitting the computer-altered reality data further comprises transmitting the first blended computer-altered reality data to the user device, the user device refining the first blended computer-altered reality data to generate second blended computer-altered reality data, the second blended computer-altered reality data being generated further based on at least one of previous computer-altered reality data, asynchronous time warp (ATW) information, occlusion handling information, or pose loop information.

4. The method of claim 1, wherein the user device receives the at least one set of rendered computer-altered reality item data, and blends, as blended computer-altered reality item data, the at least one set of rendered computer-altered reality item data.

5. The method of claim 1, wherein identifying primary node rendering coordination information further comprises identifying, via execution of rendering software that is customized by at least one of a rendering service plugin or a rendering management plugin, the primary node rendering coordination information.

6. The method of claim 1, wherein rendering by the at least one coordinated node of the computer-altered reality data further comprises utilizing coherence information in the primary node rendering coordination information to coordinate the rendering of the computer-altered reality data based on coordinated node information, the coordinated node information including at least one of coordinated node validation information, coordinated node allocation information, dynamic resource management information, or item rendering information.

7. A system comprising:

at least one processor; and non-transitory memory storing instructions that, when executed by the at least one processor, cause the at least one processor to perform operations comprising:

exchanging, with a user device, at least one communication associated with computer-altered reality data;

transmitting, to at least one coordinated node, at least one set of the computer-altered reality data, the at least one coordinated node utilizing at least one portion of computer-altered reality data rendering information to render, as rendered computer-altered reality data that includes at least one set of rendered computer-altered reality data, the at least one set of the computer-altered reality data;

receiving, from the at least one coordinated node, the at least one set of the rendered computer-altered reality data;

identifying the rendered computer-altered reality data that includes the at least one set of the rendered computer-altered reality data, the at least one set of the rendered computer-altered reality data being associated with at least one rendered item; and routing the at least one set of the rendered computer-altered reality data to the user device, wherein routing the at least one set of the rendered computer-altered reality data further comprises transmitting the rendered computer-altered reality data to the user device, wherein the user device performs at least one of an asynchronous time warp (ATW) process or an asynchronous spatial warp (ASW) process on the rendered computer-altered reality data, and blends and recomposites, based at least in part on the performing of the at least one of the ATW or the ASW process, recomposited computer-altered reality data comprising a rendered computer-altered reality frame that includes the rendered computer-altered reality data.

8. The system of claim 7, the operations further comprising:

continuously receiving user device information from the user device, the user device information including at least one of pose information, device location information, or lighting information; and dynamically performing at least one of a time synchronization or a spatial synchronization, based at least in part on the user device information.

9. The system of claim 7, wherein the at least one portion of computer-altered reality data rendering information is utilized to route the at least one set of the computer-altered reality data, and wherein individual ones of the at least one portion of the computer-altered reality data rendering information include item classification information, and the item classification information includes at least one of item interactivity information, frame rate information, or resolution information.

10. The system of claim 7, the operations further comprising:

identifying the rendered computer-altered reality data that includes the at least one set of the rendered computer-altered reality data, the at least one set of the rendered computer-altered reality data being associated with at least one rendered item, performing at least one of an asynchronous time warp (ATW) process or an asynchronous spatial warp (ASW) process on the rendered computer-altered reality data; and based at least in part on the performing of the at least one of the ATW or the ASW process, utilizing occlusion information to blend and recomposite, as recomposited computer-altered reality data, a recomposited computer-altered reality frame that includes the rendered computer-altered reality data, wherein routing the at least one set of the rendered computer-altered reality data further comprises transmitting, to the user device, the recomposited computer-altered reality frame.

11. The system of claim 7, wherein routing the at least one set of the computer-altered reality data further comprises transmitting, based at least in part on the at least one portion of the computer-altered reality data rendering information, the at least one set of the computer-altered reality data, and wherein the at least one portion of the computer-altered reality data rendering information includes one or more of at least one item classification identifier, at least one server identifier, or at least one node identifier.

12. The system of claim 7, the operations further comprising:

identifying primary node information that includes at least one of time information, frame information, universal coordinate information, global illumination (GI) synchronization information.

13. The system of claim 7, the operations further comprising:

identifying primary node information associated with at least one server, blending, as at least one set of blended computer-altered reality data, the at least one set of the rendered computer-altered reality data based at least in part on the primary node information, wherein the primary node information includes at least one of an edge node blending flag being set, and the primary node information further includes at least one of primary node location information, quality on demand (QoD) information, edge cloud guarantee information, or user device location information; and transmitting the at least one set of the blended computer-altered reality data to the user device.

14. One or more non-transitory computer-readable media storing instructions executable by at least one processor, wherein the instructions, when executed by the at least one processor, cause the at least one processor to perform operations comprising:

exchanging, with a user device, at least one communication associated with computer-altered reality data;

transmitting, to at least one coordinated node, at least one set of the computer-altered reality data, the at least one coordinated node utilizing at least one portion of computer-altered reality data rendering information to render, as rendered computer-altered reality data that includes at least one set of rendered computer-altered reality data, the at least one set of the computer-altered reality data;

receiving, from the at least one coordinated node, the at least one set of the rendered computer-altered reality data;

identifying primary node information associated with at least one server, blending, as at least one set of blended computer-altered reality data, the at least one set of the rendered computer-altered reality data based at least in part on the primary node information, wherein the primary node information includes at least one of an edge node blending flag being set, and further includes at least one of primary node location information, quality on demand (QoD) information, edge cloud guarantee information, or user device location information; and transmitting the at least one set of the blended computer-altered reality data to the user device.

15. The one or more non transitory computer readable media of claim 14, wherein routing the at least one set of the rendered computer-altered reality data further comprises:

identifying, based at least in part on at least one depth identifier associated with a depth map, occlusion information, the at least one depth identifier indicating at least one depth corresponding to at least one item associated with the at least one set of the computer-altered reality data, the at least one depth being identified with respect to a location of the user device; and blending, as at least one set of blended computer-altered reality data, the at least one set of the rendered computer-altered reality data, based at least in part on the occlusion information.

16. The one or more non transitory computer readable media of claim 14, the operations further comprising:

identifying the at least one portion of the computer-altered reality data rendering information utilized to transmit the at least one set of the computer-altered reality data, wherein the at least one portion of computer-altered reality data rendering information includes item classification information, and the item classification information includes at least one of item interactivity information, frame rate information, or resolution information.

17. The one or more non transitory computer readable media of claim 14, wherein the user device identifies user device information, the user device information including at least one of pose information, location information, or lighting information, wherein the user device identifies item classification information associated with individual ones of the at least one set of the computer-altered reality data, and the item classification information includes at least one of item interactivity information, frame rate information, or resolution information, and wherein the user device blends the rendered computer-altered reality data based at least in part on the user device information and the item classification information.

18. The one or more non transitory computer readable media of claim 14, the operations further comprising:

identifying, via execution of rendering software that is customized by at least one of a rendering service plugin or a rendering management plugin, the at least one portion of the computer-altered reality data rendering information.

19. The one or more non transitory computer readable media of claim 14, the operations further comprising:

continuously receiving user device information from the user device, the user device information including at least one of pose information, device location information, or lighting information; and dynamically performing at least one of a time synchronization or a spatial synchronization, based at least in part on the user device information.

20. The one or more non transitory computer readable media of claim 14, wherein the at least one portion of computer-altered reality data rendering information is utilized to route the at least one set of the computer-altered reality data, and wherein individual ones of the at least one portion of the computer-altered reality data rendering information include item classification information, and the item classification information includes at least one of item interactivity information, frame rate information, or resolution information.

* * * * *